US010309866B2

(12) United States Patent
Zhu et al.

(10) Patent No.: US 10,309,866 B2
(45) Date of Patent: Jun. 4, 2019

(54) MEASURING SYSTEM WITH A PRESSURE DEVICE AS WELL AS METHOD FOR MONITORING AND/OR CHECKING SUCH A PRESSURE DEVICE

(71) Applicant: Endress + Hauser Flowtec AG, Reinach (CH)

(72) Inventors: Hao Zhu, Freising (DE); Alfred Rieder, Landshut (DE); Holger Bernhard, Grenzach-Wyhlen (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 419 days.

(21) Appl. No.: 14/896,942

(22) PCT Filed: May 19, 2014

(86) PCT No.: PCT/EP2014/060192
§ 371 (c)(1),
(2) Date: Dec. 9, 2015

(87) PCT Pub. No.: WO2014/198495
PCT Pub. Date: Dec. 18, 2014

(65) Prior Publication Data
US 2016/0138997 A1    May 19, 2016

(30) Foreign Application Priority Data
Jun. 13, 2013 (DE) .......................... 10 2013 106 157

(51) Int. Cl.
G01M 5/00        (2006.01)
G01F 1/84        (2006.01)
G08B 21/18       (2006.01)

(52) U.S. Cl.
CPC ......... G01M 5/0058 (2013.01); G01F 1/8413 (2013.01); G01F 1/8431 (2013.01);
(Continued)

(58) Field of Classification Search
CPC .................................................. G01M 5/0058
See application file for complete search history.

(56) References Cited

U.S. PATENT DOCUMENTS 4,179,940 A    12/1979 Oertle
4,546,649 A *  10/1985 Kantor ..................... G01B 7/06
                                              340/870.11
(Continued)

FOREIGN PATENT DOCUMENTS

CN       1793930 A    6/2006
CN     101358827 A    2/2009
(Continued)

OTHER PUBLICATIONS

German Search Report, German PTO, Munich, DE, dated Feb. 27, 2014.
(Continued)

Primary Examiner — Manuel A Rivera Vargas
(74) Attorney, Agent, or Firm — Bacn & Thomas, PLLC

(57) ABSTRACT

The method serves for monitoring and/or checking a pressure device having a lumen surrounded by a wall for conveying and/or storing a fluid. To this end, the method comprises a step of registering both a strain of a first wall segment as well as also a strain of at least a second wall segment spaced from the first wall segment, for ascertaining a strain deviation value representing a difference between the strain of the first wall segment and the strain of the second wall segment, as well as a step of using the strain deviation value for ascertaining damage to the wall, as a result of plastic deformation of the wall and/or as a result of wear of the wall. The measuring system of the invention comprises supplementally to the pressure device a first strain sensor affixed on the first wall segment for producing a first strain signal dependent on a time variable strain of the first wall segment as well as at least a second strain sensor affixed on the second wall segment for producing a second strain signal dependent on a time variable strain of the second wall segment. Moreover, the measuring system comprises a transmitter electronics electrically coupled both with the first (Continued)

strain sensor as well as also the second strain sensor. The transmitter electronics is adapted to receive both the first strain signal as well as also the second strain signal as well as to ascertain, with application of the strain signals, damage to the wall.

81 Claims, 8 Drawing Sheets

(52) U.S. Cl.
CPC ......... *G01F 1/8477* (2013.01); *G01M 5/0033* (2013.01); *G01M 5/0041* (2013.01); *G08B 21/182* (2013.01)

(56) References Cited

U.S. PATENT DOCUMENTS

| | | | |
|---|---|---|---|
| 4,801,897 A * | 1/1989 | Flecken | G01F 1/8422 331/155 |
| 5,926,096 A | 7/1999 | Matter | |
| 2006/0266129 A1 * | 11/2006 | Eckert | G01F 1/8409 73/861.355 |
| 2008/0141789 A1 | 6/2008 | Kassubek | |
| 2012/0123705 A1 | 5/2012 | Drahm | |

FOREIGN PATENT DOCUMENTS

| | | |
|---|---|---|
| CN | 101769442 A | 7/2010 |
| DE | 3305379 A1 | 9/1984 |
| EP | 0816807 A2 | 1/1998 |
| JP | 200941924 A | 2/2009 |
| JP | 2013117459 A | 6/2013 |

OTHER PUBLICATIONS

International Search Report, EPO, The Netherlands, dated Sep. 1, 2014.
English Translation of the International Preliminary Report on Patentability, WIPO, Geneva, CH, dated Dec. 23, 2015.

* cited by examiner

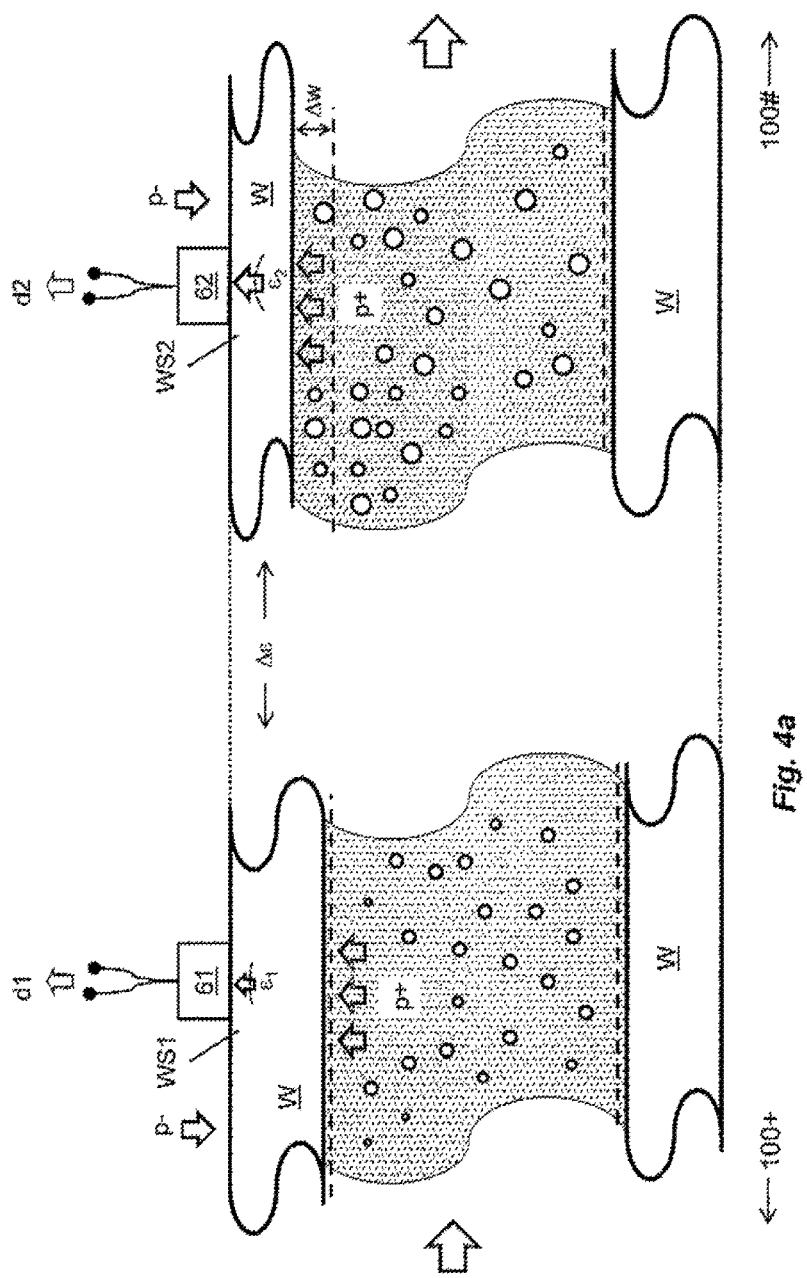
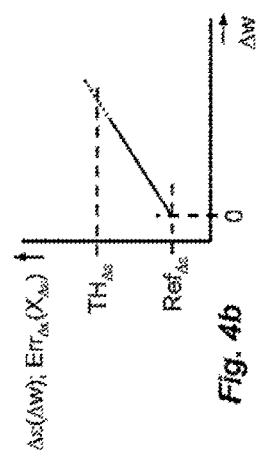
Fig. 4a
Fig. 4b

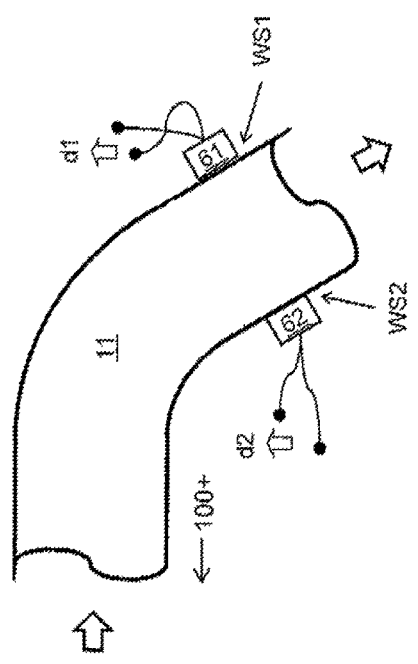
Fig. 5
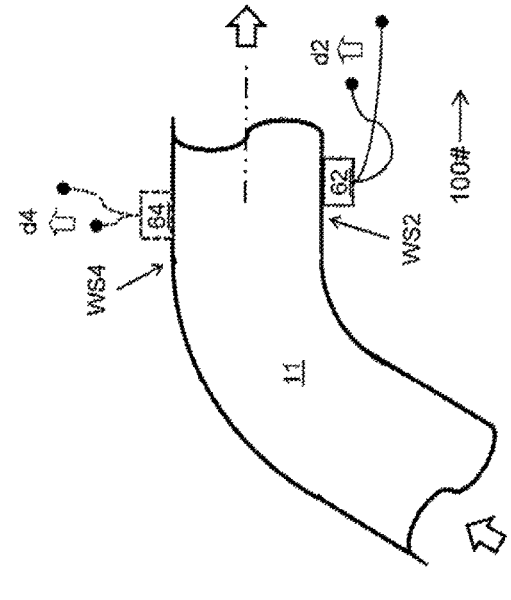
Fig. 6
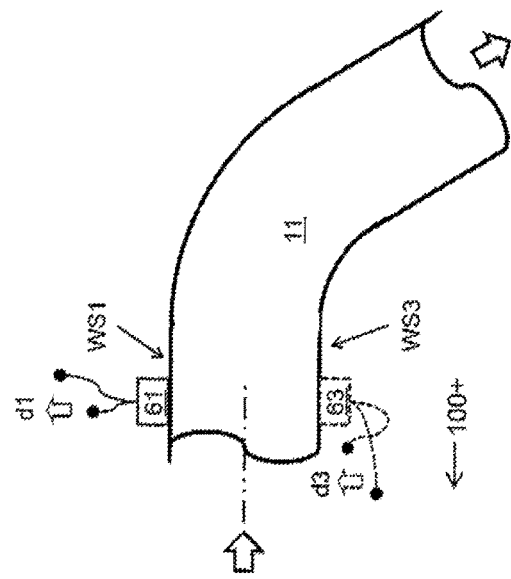

MEASURING SYSTEM WITH A PRESSURE DEVICE AS WELL AS METHOD FOR MONITORING AND/OR CHECKING SUCH A PRESSURE DEVICE

TECHNICAL FIELD

The invention relates to a method for monitoring and/or checking a pressure device having a lumen surrounded by a wall, for example, a metal wall, namely a device for conveying and/or storing in said lumen a fluid, for example, a gas, a liquid or a flowable dispersion, acting nominally with a static positive pressure, respectively a pressure of greater than 1 bar, on the wall. Moreover, the invention relates to a measuring system (especially a measuring system suitable for implementing said method) for ascertaining a measured variable, for example, a fluid dynamic and/or thermodynamic, measured variable, such as e.g. a volume flow rate, a mass flow rate, a density, a viscosity, a pressure or a temperature of a fluid, which measuring system comprises such a pressure device.

BACKGROUND DISCUSSION

Pressure devices, for example, also those subject to the "Guideline 97/23/EH of the European Parliament and the Advisory of 29 May 1997 for equalizing the laws and regulations of the member states concerning pressure devices" or corresponding national laws and regulations—, at times, also referred to as pressure device guidelines, such as, for instance, the "Fourteenth enactment of the product safety law" (14. ProdSV) or the "ASME Boiler and Pressure Vessel Code" (ASME U-Stamp), find varied application in industrial settings, not least of all also in industrial measuring- and automation technology, for example, in the form of tanks for liquefied gas, autoclaves or other containers for accommodating, respectively storing, fluids under increased pressure relative to the surrounding atmosphere, in the form of pipelines suitable for the transport of such fluids under increased pressure or also in the form of plants formed by means of such containers and/or pipelines, consequently such regularly operated with increased operational pressures. To be mentioned as other representatives of such pressure devices are additionally measuring transducers communicating with the aforementioned pipelines, respectively containers, consequently contacted by fluid guided therein, respectively also flowed through by the fluid, for generating a measurement signal corresponding to a measured variable to be registered for the fluid, respectively measuring systems formed by means of such measuring transducers and transmitter electronics electrically connected therewith, such as e.g. Coriolis, mass flow, measuring devices, vortex, flow measuring devices or also ultrasonic, flow measuring devices or measuring apparatuses formed therewith, not least of all also such, in the case of which the lumen of the pressure device is formed by means of a tube arrangement having at least one measuring tube conveying fluid during operation. Examples of such pressure devices, regularly also being subject to one or more the aforementioned laws or regulations and/or embodied as measuring systems for fluids standing at least, at times, under high pressure of over 50 bar, are described in, among others, European Patents, EP A 816 807, EP A 919 793 and EP A 1 001 254, US A 2001/0029790, US A 2004/0261541, US A 2005/0039547, US A 2006/0266129, US A 2007/0095153, US A 2007/0234824, US A 2008/0141789, US A 2011/0113896, US A 2011/0161018, US A 2011/0219872, US A 2012/0123705, U.S. Pat. No. 4,680,974, and published International Applications, WO A 2005/050145, WO A 2009/134268, WO A 90/15310, WO A 95/16897, WO A 96/05484, WO A 97/40348, WO A 98/07009 or WO A 99/39164.

The measuring systems disclosed therein are each formed by means of a measuring transducer of vibration-type insertable into the course of a pipeline and flowed-through by fluid during operation, wherein each of the measuring transducers comprises a tube arrangement formed by means of at least one, essentially straight or at least sectionally curved, e.g. U-, or V-shaped, measuring tube, in such a manner that wall and lumen are also, in each case, formed by means of the at least one measuring tube and the lumen communicates during operation with a lumen of the connected pipeline.

In operation of the pressure device, respectively the measuring system formed therewith, the at least one measuring tube is actively excited to execute mechanical oscillations for the purpose of generating oscillation signals influenced by the through flowing fluid, for example, by its mass flow rate, its density and/or its viscosity, and serving, in each case, also as measurement signal of the measuring transducer. Other examples of such measuring systems formed by means of a pressure device are described, among other things, also in U.S. Pat. Nos. 5,796,011, 7,284,449, 7,017,424, 6,910,366, 6,840,109, 5,576,500, 6,651,513, US A 2005/0072238, US A 2006/0225493, US A 2008/0072688, US A 2011/0265580, and Published International Applications, WO A 2006/009548, WO A 2008/042290, WO A 2007/040468 or WO A 2013/060659.

Each of the measuring transducer includes additionally a measuring transducer housing surrounding the tube arrangement, namely a measuring transducer housing forming a cavity accommodating the tube arrangement as well as, formed on the measuring transducer housing, respectively integrated therein, an inlet-side connecting flange as well as an outlet-side connecting flange for connecting the tube arrangement with the pipeline. For the case, in which the tube arrangement, consequently the lumen, is formed by means of two or more measuring tubes, the measuring tubes are most often inserted into the pipeline to form flow paths for parallel flow via a flow divider extending on the inlet side between the measuring tubes and the inlet-side connecting flange as well as via a flow divider extending on the outlet side between the measuring tubes and the outlet-side connecting flange. The measuring transducer housing serves besides for holding the tube arrangement placed within the cavity formed by the measuring transducer housing, especially, also to protect such as well as other internally lying components, for example, a sensor arrangement of the measuring transducer, against external, environmental influences, such as e.g. dust or water spray, consequently to provide a cavity as hermetically sealed as possible. Particularly in the case of pressure devices of the type being discussed, the user can, moreover, at times, also require of the measuring transducer housing that it in the case of an unsealed or bursting tube arrangement can withstand the static internal pressure within the cavity lying most often significantly over the atmospheric, external pressure at least for a predetermined time leak-free. Consequently, the measuring transducer housing must have a certain pressure resistance; compare, for this, also the above mentioned US A 2006/0266129, US A 2005/0039547, US A 2001/0029790, Published International Application WO A 90/15310, EPA 1 001 254, respectively the international patent application PCT/EP2012/070924. Particularly for applications with toxic or easily flammable fluids, the measuring transducer housing must, in such case, at times, also be able to fulfill the requirements placed on safety containers.

Measuring systems of the type being discussed, consequently pressure devices formed therewith, are additionally usually connected with one another and/or with corresponding electronic controllers by means of a—wired and/or radio-based—data transmission network provided within the superordinated data processing system, for example, programmable logic controllers (PLC) installed on-site or with stationary process-control computers in a remote control room, where the measured values produced by means of the measuring system and digitized and correspondingly encoded in suitable manner are forwarded. By means of process-control computers, using correspondingly installed software components, the transmitted measured values can be further processed and visualized as corresponding measurement results e.g. on monitors and/or converted into control signals for other field devices embodied as actuating devices, such as e.g. magnetic valves, electric motors, etc. Accordingly, the data processing system serves usually also to condition the measured value signal delivered from the transmitter electronics in a manner corresponding to the requirements of downstream data transmission networks, for example, suitably to digitize the measured value signal and, in given cases, to convert it into a corresponding telegram, and/or to evaluate it on-site. For such purpose, there are provided in such data processing systems, electrically coupled with the respective connecting lines, evaluating circuits, which pre- and/or further process as well as, in case required, suitably convert, the measured values received from the respective transmitter electronics. Serving for data transmission in such industrial data processing systems, at least sectionally, are fieldbusses, especially serial fieldbusses, such as e.g. FOUNDATION FIELDBUS, CAN, CAN-OPEN RACKBUS-RS 485, PROFIBUS, etc., or, for example, also networks based on the ETHERNET-standards as well as the corresponding, most often application independent, standardized transmission-protocols.

Pressure devices of the type being discussed can during operation be exposed, at times, to increased loadings, in given cases, also loadings above earlier agreed limit values, consequently loadings damaging to the integrity of the pressure device, be it through undesired overloadings as regards the operating pressure, through the occurrence of undesired inhomogeneities in a fluid having, in given cases, also high flow velocities of greater than 10 ms 1, for example, in the form of solid particles entrained in the flowing fluid and/or gas bubbles entrained in liquid carrier medium, and/or undesired thermal overloading, for example, as a result of too high temperatures of the respective fluid and/or unfavorable time temperature curves, along with spatial temperature distributions unfavorable to the integrity of the pressure device. As a result of such loadings, respectively overloadings, the wall of the pressure device can be partially so damaged—, for instance, as a result of plastic deformation of the wall and/or as a result of wear of the wall, namely as a result of removal of material from the surface facing the lumen—, that the pressure device has a pressure resistance lessened in comparison to an original, respectively nominal, pressure resistance; this, for example, also in such a manner that damage of the wall within a very short time can exceed a critical damage earlier set for the respective pressure device. The critical damage of the wall can, for example, correspond to a damage specifically ascertained for the respective type, respectively the particular series of the pressure device, damage which, in given cases, also requires immediate inspection of the respective pressure device, and/or which corresponds to lessened remaining life of the particular pressure device requiring an immediate, respectively extraordinary, replacement of the pressure device.

For the mentioned case, in which the pressure device is a measuring transducer, respectively a component of a measuring system, the critical damage set for the respective pressure device can also correspond to a lessened accuracy of measurement of the measuring system resulting from such damage, respectively to a, in given cases, no longer tolerable, increased systematic measuring error in the case of generating the measurement signal, for example, as a result of damage to the respective at least one measuring tube. Of special interest, in such case, are also such measuring systems, in the case of which, such as already mentioned, the pressure device is formed by means of a measuring transducer of vibration-type. On the one hand, their respective measuring tubes are most often embodied as thin walled as possible, in order to achieve an as high as possible sensitivity of their oscillation signals, especially as regards the mass flow rate, respectively density, of the respective fluid to be measured. Consequently, the tube arrangement of such a measuring transducer has usually walls with a comparatively small, namely only low, respectively minimal, allowable safety reserves as regards wall thicknesses providing the pressure resistance. On the other hand, of interest, however, can also be even small damage to the wall, namely damage not yet sinking the pressure resistance of the tube arrangement, respectively of the pressure device formed therewith, to an unallowable low measure, because, such as, among other things, also discussed in the above mentioned EP-A 816 807, WO-A 2005/050145, WO-A 99/39164, WO-A 96/05484, US-A 2007/0095153, respectively US-A 2012/0123705, also such damage, arising distributed most often also spatially rather non-uniformly over the tube arrangement can have considerable effects on the accuracy of measurement of the measuring system, not least of all also those measuring systems with which the mass flow rate, respectively the density, are measured.

Methods, respectively measuring systems with measuring apparatuses, which are suitable, as early as possible, to detect, respectively to be able to predict, undesirably, respectively unallowably high, damage of the aforementioned type to such pressure devices formed by means of measuring transducers of vibration-type, respectively to be able to estimate quantitatively an extent such damage, are described, among other things, in the above mentioned US A 2007/0095153 and US A 2006/0266129; European Patent EP A 816 807; US A 2012/0123705; and Published International Applications WO A 2005/050145, WO A 96/05484 or WO A 99/39164. Fundamentally, the therein disclosed methods operate based on the evaluation of oscillation signals delivered by means of the measuring transducers during operation, in given cases, also by additional taking into consideration of exciter signals effecting the respective oscillations of the at least one measuring tube. Although these methods, respectively measuring arrangements, in the case of measuring systems, respectively pressure devices, formed by means of measuring transducers of vibration-type can be used very advantageously, respectively applied also in increasing measure, a disadvantage of such methods, respectively measuring arrangements, is to be seen in the fact that they operate based on measurement signals—here the oscillation signals specific for such measuring systems and, thus, are applicable exclusively for such measuring systems, consequently actually only for a relatively small part of the totality of pressure devices. Additionally, the mentioned methods, respectively measuring arrangements, can, at times, also have certain cross sensitivities to measured variables, not least of all to the above referenced measured variables, mass flow rate, density and/or viscosity, representing other than the actual damage, and these cross sensitivities must be correspondingly compensated, be it by applying in the measuring system supplementally provided sensor systems and/or from measured values supplementally ascertained externally of the measuring system, in order reliably to ascertain alarmable damage of the wall, respectively to be able safely to prevent false alarms.

SUMMARY OF THE INVENTION

Taking the above into consideration, an object of the invention is to provide a method, respectively a corresponding measuring system, by means of which, also without application of oscillation signals representing vibrations of the respective wall, the wall of a pressure device of the type being discussed, consequently also a pressure device without measuring transducers of vibration-type, can be examined for possible damage—respectively, conversely, for its structural integrity—, and by means of which even small structural changes of the respective wall, e.g. a lessening of the wall thickness as a result of wear or plastic deformation of the wall, can be reliably detected, respectively reported very early.

For achieving the object, the invention resides in a method for monitoring and/or checking a pressure device having a lumen surrounded by a wall, for example, a metal wall, namely a device for conveying and/or storing a fluid, for example, a gas, a liquid or a flowable dispersion, in the lumen, for example, a fluid acting nominally with a static pressure of greater than 1 bar on the wall, which method comprises the steps as follows: registering both a strain (for example, a time variable strain and/or a strain dependent on a static internal pressure reigning within the lumen) of a first wall segment of the wall, for example, a metal first wall segment, as well as also a strain (for example, a time variable strain and/or a strain dependent on a static internal pressure reigning within the lumen) of at least a second wall segment of the wall spaced from the first wall segment, for example, a second second wall segment wearing faster and/or more strongly in comparison with the first wall segment, for example, a metal second wall segment, for ascertaining a strain deviation value representing a difference between the strain of the first wall segment and the strain of the second wall segment; as well as using the strain deviation value for ascertaining damage to the wall, for example, damage influencing pressure resistance of the pressure device and/or co-determining remaining life of the pressure device and/or exceeding critical damage to the wall earlier established for the pressure device, for example, damage resulting from plastic deformation of the wall and/or as a result of wear of the wall.

Moreover, the invention resides in a measuring system, for example, also a measuring system suitable for implementing the method of the invention, for ascertaining measured values representing at least one measured variable, for example, a fluid dynamic and/or thermodynamic, measured variable, (e.g. volume flow rate, mass flow rate, density, viscosity, pressure, temperature, etc.) of a fluid (e.g. gas, liquid, flowable dispersion), which measuring system comprises: a pressure device having a lumen surrounded by a wall, for example, a metal wall, namely a device for conveying and/or storing the fluid in the lumen, for example, a fluid nominally acting with a pressure of greater than 0.5 bar on the wall; a first strain sensor affixed on a first wall segment of the wall, for example, a metal first wall segment, for example, a first strain sensor formed by means of a strain gage, for producing a first strain signal dependent on a time variable strain of the first wall segment, for example, a first strain signal having an electrical voltage dependent on said strain and/or an electrical current dependent on said strain; at least a second strain sensor affixed on a second wall segment of the wall spaced from the first wall segment, for example, a second wall segment wearing faster and/or more strongly in comparison with the first wall segment and/or a metal second wall segment, for example, a second strain sensor formed by means of a strain gage and/or constructed equally to the first strain sensor, for producing a second strain signal dependent on a time variable strain of the second wall segment, for example, a second strain signal having an electrical voltage dependent on said strain and/or an electrical current dependent on said strain; as well as a transmitter electronics electrically coupled both with the first strain sensor as well as also with the second strain sensor. Said transmitter electronics is adapted to receive both the first strain signal as well as also the second strain signal, as well as, with application both of the first as well as also of the second strain signal, to ascertain a damage to the wall, for example, a damage lessening pressure resistance of the pressure device and/or co-determining a remaining life of the pressure device and/or resulting from plastic deformation of the wall and/or from wear of the wall, for example, namely to ascertain a damage value representing a characterizing number value for a damage characterizing number quantifying damage to the wall.

In a first embodiment of the method of the invention, the step of ascertaining damage to the wall comprises a step of using the strain deviation value for ascertaining a deviation of the strain difference from an earlier ascertained, initial strain difference, for example, for the pressure device with undamaged wall or for an equally constructed, other pressure device.

In a second embodiment of the method of the invention, such further comprises a step of producing a first strain signal dependent on a time variable strain of the first wall segment, for example, having an electrical voltage dependent on the strain and/or an electrical current dependent on the strain, as well as a step of producing a second strain signal dependent on a time variable strain of the second wall segment, for example, having an electrical voltage dependent on the strain and/or an electrical current dependent on the strain. Developing this embodiment of the invention further, the method additionally comprises a step of using a strain gage affixed on the first wall segment for producing the first strain signal as well as a strain gage affixed on the second wall segment for producing the second strain signal and/or a step of using the first strain signal as well as also the second strain signal for ascertaining the strain deviation value.

In a third embodiment of the method of the invention, such further comprises a step of producing a first strain signal dependent on a time variable strain of the first wall segment, for example, a first strain signal having an electrical voltage dependent on the strain and/or an electrical current dependent on the strain, as a well as a step of producing a second strain signal dependent on a time variable strain of the second wall segment, for example, a second strain signal having an electrical voltage dependent on the strain and/or an electrical current dependent on the strain, and it is, furthermore, provided that the step of ascertaining the strain deviation value comprises a step of using the first strain signal as well as also the second strain signal, for example, in such a manner that at least one signal parameter is derived both from the first strain signal as well as also from the second strain signal. Developing this embodiment of the invention further, for ascertaining the strain deviation value both from the first strain signal as well as also from the second strain signal, in each case, at least one parameter measured value is ascertained for a signal parameter characterizing the particular strain signal, for example, instantaneous values of each of the two strain signals and/or effective values (RMS) or other location parameters of the two strain signals and/or variances of each of the two strain signals and/or other scatter parameters of each of the two strain signals. For ascertaining the strain deviation value, for example, then a difference between the signal parameter derived from the first strain signal and the signal parameter derived from the second strain signal and/or a quotient between the signal parameter derived from the first strain signal and the signal parameter derived from the second strain signal can be ascertained.

In a fourth embodiment of the method of the invention, such further comprises a step of generating a warning report, which signals, for example, visually and/or acoustically perceivably, critical damage to the wall, for example, damage corresponding to maximum allowable damage to the wall earlier established for the pressure device and/or damage requiring an inspection of the pressure device.

In a fifth embodiment of the method of the invention, the step of ascertaining damage to the wall comprises a step of using the strain deviation value for ascertaining a damage value, namely a characterizing value for a damage characterizing number quantifying damage to the wall, for example, a damage characterizing number representing a deviation of the strain difference from an earlier ascertained reference value. The damage value can represent, for example, a relative or absolute deviation of the strain difference from a reference value ascertained therefor, for example, ascertained earlier on the pressure device with undamaged wall or earlier on an equally-constructed, other pressure device. Developing this embodiment of the invention further, the step of ascertaining damage to the wall comprises a step of using the damage value, for example, in such a manner that the damage value is compared with a predetermined threshold value.

In a sixth embodiment of the method of the invention, such further comprises a step of generating a warning report, which signals, for example, visually and/or acoustically perceivably, critical damage to the wall, for example, damage corresponding to maximum allowable damage to the wall earlier established for the pressure device and/or damage requiring an inspection of the pressure device, and additionally the step of ascertaining damage to the wall comprises a step of using the strain deviation value for ascertaining a damage value, namely a characterizing value for a damage characterizing number quantifying damage to the wall, for example, a damage characterizing number representing a deviation of the strain difference from an earlier ascertained reference value. Developing this embodiment of the invention further, the step of generating the warning report comprises a step of comparing the damage value with a predetermined threshold value, for example, a threshold value representing critical damage to the wall earlier established for the pressure device.

In a seventh embodiment of the method of the invention, such further comprises a step of ascertaining a strain value representing, for example, a local or average, strain of the wall, for example, a strain of exactly one of the wall segments. Developing this embodiment of the invention further, the step of ascertaining the strain value comprises a step of registering the strain of at least one of the wall segments, for example, at least of the first wall segment, and/or the step of ascertaining damage to the wall comprises a step of using the strain value.

In a eighth embodiment of the method of the invention, such further comprises a step of ascertaining a strain value representing, for example, a local or average strain of the wall, for example, a strain of exactly one of the wall segments. Developing this embodiment of the invention further, the step of ascertaining damage to the wall comprises a step of using the strain value as well as a step of generating a warning report, which signals, for example, visually and/or acoustically perceivably, critical damage to the wall, for example, damage corresponding to a maximum allowable damage to the wall earlier established for the pressure device and/or damage requiring an inspection of the pressure device. Developing this embodiment of the invention further, the step of generating the warning report comprises a step of using the strain value.

In a ninth embodiment of the method of the invention, the step of ascertaining damage to the wall comprises a step of registering a static internal pressure reigning within the lumen, for example, relative to an ambient pressure acting externally on the wall, and/or a step of registering a temperature of the wall, for example, on a side of the wall facing away from the lumen.

In a tenth embodiment of the method of the invention, such further comprises a step of modifying a pressure difference existing between a static internal pressure reigning within the lumen and an ambient pressure acting externally on the wall for elastically deforming at least portions of the wall, namely at least the first wall segment of the wall and at least the second wall segment of the wall. Developing this embodiment of the invention further, the step of modifying the pressure difference comprises a step of increasing the static internal pressure to a pressure value, which is, for example, more than 0.5 bar, more than the ambient pressure and/or the step of modifying the pressure difference comprises a step of allowing fluid to flow into the lumen of the pressure device and/or the step of modifying the pressure difference comprises a step of allowing fluid to flow through the lumen of the pressure device and/or the step of modifying the pressure difference comprises a step of allowing fluid to flow out of the lumen of the pressure device In an eleventh embodiment of the method of the invention, such further comprises a step of allowing fluid to flow into the lumen of the pressure device, for example, for increasing a static internal pressure reigning within the lumen to a pressure value higher than the ambient pressure.

In a twelfth embodiment of the method of the invention, such further comprises a step of allowing fluid to flow through the lumen of the pressure device, for example, for increasing a static internal pressure reigning within the lumen to a pressure value higher than the ambient pressure. Developing this embodiment of the invention further, it is, furthermore, provided that the first wall segment is arranged relative to a flow direction of the fluid upstream of the second wall segment.

In a thirteenth embodiment of the method of the invention, such further comprises a step of allowing fluid to flow out of the lumen of the pressure device.

In a fourteenth embodiment of the method of the invention, the pressure device comprises a measuring transducer, for example, a measuring transducer of vibration-type, which measuring transducer is adapted to register at least one, for example, fluid dynamic or thermodynamic, measured variable, for example, a volume flow rate, a mass flow rate, a density, a viscosity, a pressure or a temperature, of the fluid and to transduce such into at least one measurement signal, for example, an electrical, measurement signal, corresponding to the measured variable. Developing this embodiment of the invention further, it is, additionally, provided that the pressure device comprises, electrically coupled with the measuring transducer, a transmitter electronics, which is adapted to receive the at least one measurement signal, and to ascertain with application of the measurement signal at least one measured value, which represents the at least one measured variable. Developing this embodiment of the invention further, it is, additionally, provided that the step of ascertaining damage to the wall is executed with application of the transmitter electronics. Alternatively thereto or in supplementation thereof, it is, furthermore, provided that the measuring transducer has a tube arrangement for conveying the flowable medium, for example, a tube arrangement formed by means of at least one tube, and that the lumen of the pressure device is formed by means of the tube arrangement, for example, in such a manner that the tube arrangement of the measuring transducer is formed by means of at least two tubes, for example, tubes connected for parallel flow and/or curved tubes, and/or that the tube arrangement includes at least one of the wall segments, for example, both the first wall segment as well as also the second wall segment.

In a fifteenth embodiment of the method of the invention, it is, furthermore, provided that the pressure device comprises a pipeline.

In a sixteenth embodiment of the method of the invention, it is, furthermore, provided that the pressure device comprises a tank.

In a seventeenth embodiment of the method of the invention, it is, furthermore, provided that the pressure device comprises a boiler, for example, an autoclave.

In a first embodiment of the measuring system of the invention, it is, furthermore, provided that the transmitter electronics is adapted, by applying the first as well as also the second strain signals, to generate a strain deviation value representing a difference between the strain of the first wall segment and the second wall segment, and that the transmitter electronics is adapted, by applying the strain deviation value, to ascertain damage to the wall. Developing this embodiment of the invention further, the transmitter electronics is, additionally, adapted, for generating the strain deviation value, to ascertain for signal parameters characterizing the first strain signal as well as the second strain signal, for example, signal parameters such as instantaneous values, effective values (RMS) and/or other location parameters and/or variances and/or other scatter parameters, recurringly, parameter measured values quantifying the signal parameters, for example, in such a manner that the transmitter electronics forms a difference and/or a quotient by means of at least one parameter measured value derived from the first strain signal as well as at least one parameter measured value derived from the second strain signal.

In a second embodiment of the measuring system of the invention, it is, furthermore, provided that the transmitter electronics is adapted, based on the first as well as also the second strain signal—, for example, by applying a strain deviation value ascertained based on the first and second strain signals and representing a deviation between the strains of the first and second wall segments—to generate a warning report signaling, for example, visually and/or acoustically perceivably, the damage. Developing this embodiment of the invention further, the transmitter electronics is further adapted to generate the warning report, in case a damage value ascertained based on the first and second strain signals, and representing, for example, an absolute or relative mutual deviation of signal parameters derived from each of the two strain signals, exceeds a predetermined threshold value, for example, a threshold value representing for the pressure device an earlier established, critical damage to the wall.

In a third embodiment of the measuring system of the invention, it is, furthermore, provided that the transmitter electronics is adapted, based on the first and second strain signals—, for example, with application of a strain deviation value ascertained based on the first strain signal and the second strain signal and representing a deviation between the strain of the first wall segment and that of the second wall segment—to ascertain a damage value, namely a characterizing number value for a damage characterizing number quantifying an instantaneous damage to the wall. Developing this embodiment of the invention further, it is, additionally, provided that the damage value represents a, for example, relative or absolute, deviation of the strain deviation value from a reference value ascertained therefor, for example, earlier on the pressure device with undamaged wall or earlier on an equally-constructed, other pressure device.

In a fourth embodiment of the measuring system of the invention, the transmitter electronics is, furthermore, adapted to compare the damage value with a predetermined threshold value for ascertaining damage to the wall.

In a fifth embodiment of the measuring system of the invention, it is, furthermore, provided that the pressure device has a measuring transducer, for example, a measuring transducer of vibration-type, having a tube arrangement formed by means of at least one, for example, at least sectionally curved, tube for conveying the fluid, which measuring transducer is adapted to deliver at least one measurement signal, for example, an electrical, measurement signal, corresponding to the measured variable and that the lumen of the pressure device is formed by means of the tube arrangement. Alternatively thereto or in supplementation thereof, it is provided that the tube arrangement of the measuring transducer has at least two tubes, for example, tubes forming paths of the tube arrangement for parallel flow and/or four tubes and/or equally constructed tubes. In such case, the first strain sensor and the second strain sensor can be affixed to the tubes, namely, for example, to one and the same tube or in such a manner that the second strain sensor is not affixed to the same tube as the first strain sensor.

In a sixth embodiment of the measuring system of the invention, it is, furthermore, provided that the pressure device is a measuring transducer, for example, a measuring transducer of vibration-type, having a tube arrangement formed by means of at least one tube, for example, an at least sectionally curved tube, for conveying the fluid, that the measuring transducer is adapted to deliver at least one measurement signal corresponding to the measured variable, for example, an electrical, measurement signal, that the lumen of the pressure device is formed by means of the tube arrangement, and that the transmitter electronics is electrically coupled with the measuring transducer. Developing this embodiment of the invention further, the transmitter electronics is additionally adapted to receive the at least one measurement signal as well as, by applying the measurement signal, to acertain a measured value, which represents a physical, for example, fluid dynamic and/or thermodynamic, measured variable, for example, a volume flow rate, a mass flow rate, a density, a viscosity, a pressure or a temperature, of the fluid, and/or the transmitter electronics is adapted to deliver at least one electrical driver signal for driving the measuring transducer, for example, an electrical driver signal inducing in the measuring transducer a measurable effect corresponding to the at least one measured variable.

A basic idea of the invention is to check, respectively to monitor, pressure devices of the type being discussed for structural integrity by recurringly registering strains of at least two mutually spaced wall segments of the respective enveloping wall of the fluid conveying lumen. Based on continuous, or in predetermined time intervals recurring, observation of the at least two locally registered strains, respectively time curves of the strains, for instance, based on strain signals generated by means of strain sensors placed on the respective wall segments, and with application of a transmitter electronics electrically coupled with the strain sensors, possible damage to the wall of the pressure device, be it in the form of wear caused by material removal or in the form of plastic deformation due to possible overloading, can be recognized, very rapidly.

Since namely all the wall segments bound one and the same lumen, consequently at least in the original state of the pressure device, respectively in the case of undamaged wall, react to one and the same impressed pressure loading, for instance, as a result of an internal pressure increased relative to the surrounding atmosphere, respectively to one and the same impressed pressure distribution in the lumen, with an elastic deformation varying only within a tolerance range specific to a particular pressure device, in the case of significant deviation of the two registered expansions from one another, namely beyond a predetermined measure of tolerance, consequently lying outside of the tolerance range, corresponding damage to the wall can be deduced. Such a deviation of strain can by applying the aforementioned strain signals additionally also be converted by means of the aforementioned transmitter electronics into a damage value corresponding to a characterizing number value for a damage characterizing number quantifying the instantaneous damage to the wall, for example, by ascertaining one or more parameter values for one or more signal parameters characterizing the strain signals. Serving as damage value can be e.g. an absolute or relative deviation between parameter values or their deviation instantaneously representing the respective signal parameters from an earlier ascertained reference value, for example, for the pressure device with undamaged wall or for an equally constructed, other pressure device.

With knowledge of the extent such damage, by corresponding comparison with reference data earlier ascertained for the pressure device, it can, furthermore, also be detected, whether further operation of the pressure device is still directly possible, not least of all also without that a degrading of other plant regions or even an endangering of persons or environment would be experienced, by evaluating returned observations, respectively a time curve of damage, also a rate with which the damage is increasing, can be ascertained, for example, in order, based thereon, to estimate a remaining life probably remaining for the respective pressure device, respectively, conversely, to predict a point in time of the reaching of an earlier fixed critical damage to the wall for the pressure device, consequently to be able to discover, early, impending dangerous situations as a result of a lessened pressure resistance.

The invention is based, in such case, among other things, on the recognition that the wall component of pressure devices of the type being discussed is typically non-uniformly damaged in the course of operation, in such a manner that the wall, on the one hand, has wall segments, which even after a long period of observation are scarcely damaged, and, on the other hand, also wall segments, which in comparison to other wall segments wear significantly faster, respectively, in the same observation time span, appear to wear more strongly. This happens surprisingly regularly, not least of all also in the case of wall thicknesses typical for pressure devices of the type being discussed, in such a manner that, in the case of corresponding selection of the wall segments to be observed as regards strain, comparatively large, consequently directly measurable strain changes, respectively differences, even in the case of small, consequently, first of all, uncritical, damage to the wall, can be provoked. Moreover, there can be identified on the wall of such pressure devices regularly also individual wall segments, such as e.g. in the region of an arc shaped section of a tube flowed-through by fluid and/or in a region of such a tube having increased cavitation risk and/or in the region of an abrupt cross-sectional enlargement, which in the case of load, respectively overloading, experience a shape change—, for example, due to removal of material from the surface facing the lumen or due to plastic deformation—, consequently damage, whose extent, for instance, as regards a scope of damage and/or a degree of damage, in comparison to possible shape changes, respectively damage to other wall segments within the same observation time span, are significantly higher than expected, respectively, conversely, typically also such wall segments of the wall are identifiable, in the case of which the extent of such a shape change, respectively damage within the mentioned observation time span, even in the case of higher overloadings, are significantly lower than expected, as compared with other wall segments.

The invention as well as other advantageous embodiments and utilities thereof will now be explained in greater detail based on examples of embodiments shown in the figures of the drawing. Equal parts are provided in all figures with equal reference characters. When perspicuity requires or it otherwise appears sensible, reference characters already appearing in antecedent figures are omitted in subsequent figures. Other advantageous embodiments or further developments, especially also combinations, of initially only individually explained aspects of the invention, will become evident, furthermore, from the figures of the drawing, as well as also from the dependent claims per se.

BRIEF DESCRIPTION OF THE DRAWINGS

The figures of the drawing show as follows:

FIG. 4a schematically, an arrangement of strain sensors mounted to a wall of a pressure device, especially a pressure device according to FIGS. 1, 2, for registering strains of a first wall segment as well as of a second wall segment of the wall;

FIG. 4b qualitatively, dependence of a strain difference on the extent of the damage to the wall, respectively dependence of a damage characterizing number quantifying the damage on a strain deviation value X representing the strain difference;

FIGS. 5 and 6 different other variants for arranging strain sensors on a wall of a pressure device, especially a pressure device according to FIGS. 1, 2;

DETAILED DISCUSSION IN CONJUNCTION WITH THE DRAWINGS

Figure 1:
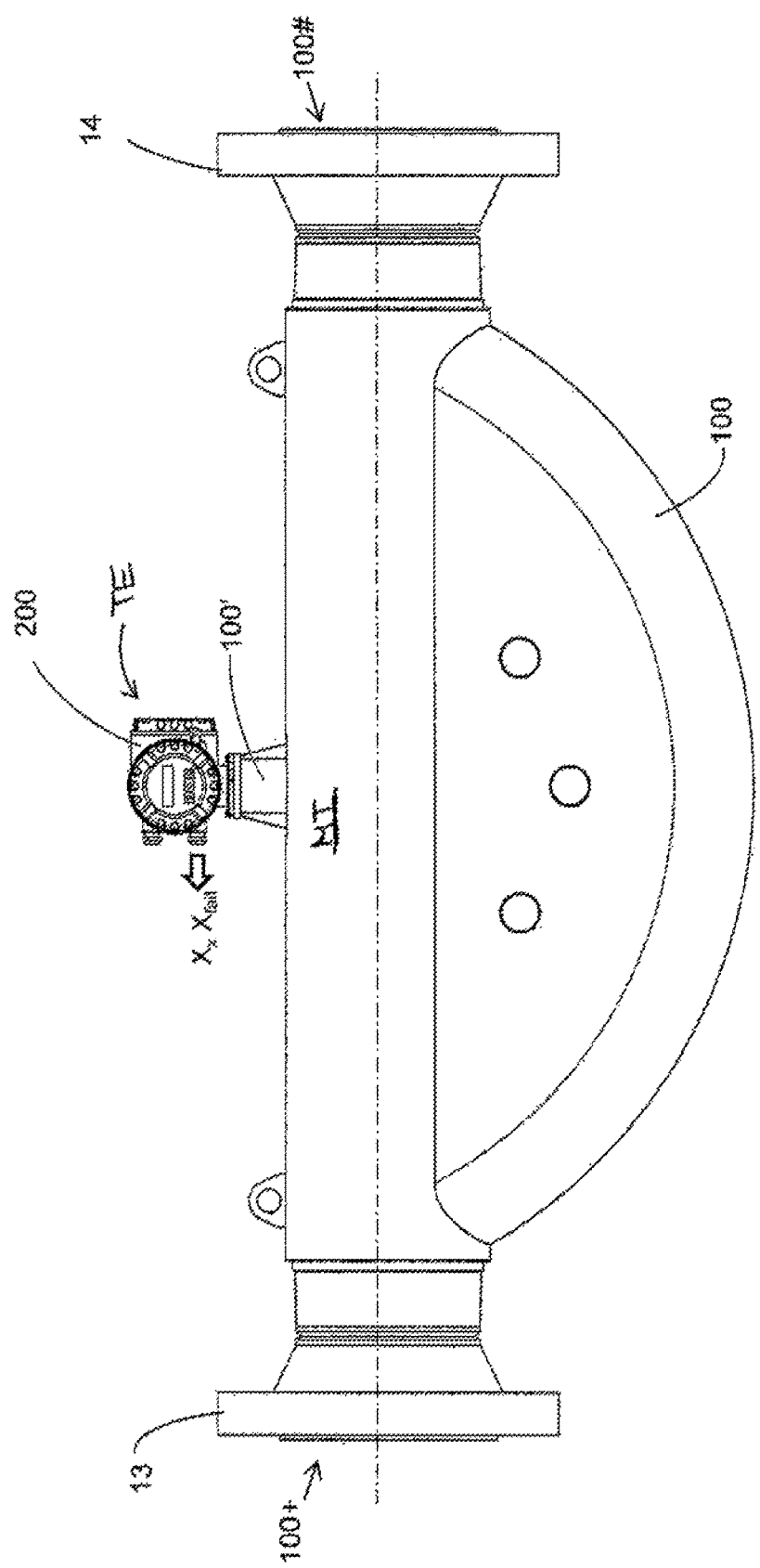
FIG. 1 and FIG. 2 a pressure device shown in different views and embodied as an in-line measuring device.
Figure 2:
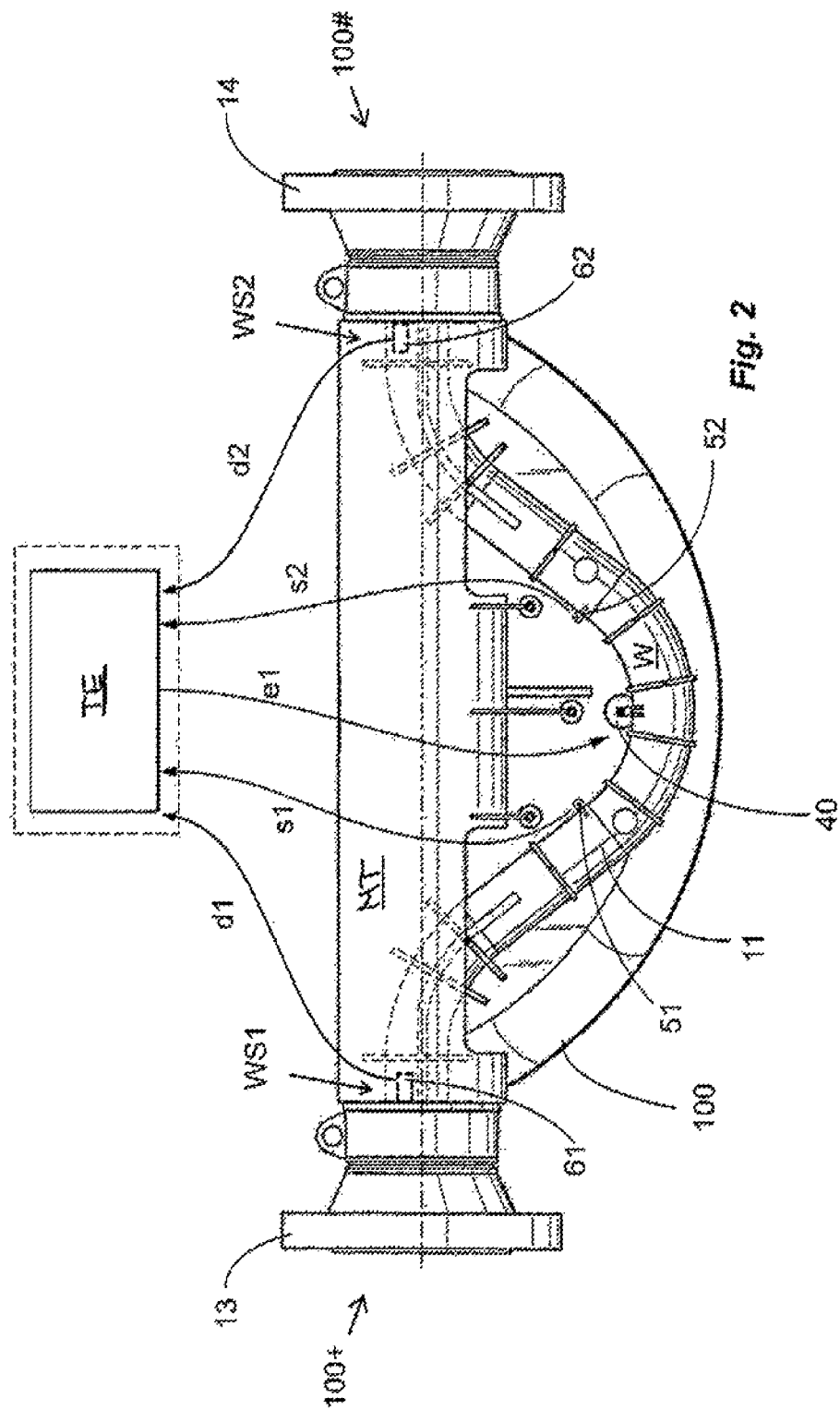

Shown schematically In FIGS. 1 and 2 is an example of an embodiment of a pressure device. The pressure device is provided for conveying, respectively for holding ready for a certain period of time, in a lumen surrounded by a wall W, for example, a metal wall,—here extending from an inlet end 100+ to an outlet end 100#—a fluid, for example, a gas, a liquid or a flowable medium, for instance a fluid dispersion, in given cases, also a dispersion first formed in the course of the flow by cavitation or precipitation, such as a e.g. a foam, a suspension or an aerosol. Especially, the pressure device is, furthermore, adapted and designed to convey in the lumen a fluid acting on the wall W nominally with a static pressure, respectively a gauge pressure, of greater than 1 bar, especially also greater than 10 bar, manufactured, for example, of a stainless steel, a titanium alloy and/or a zirconium-alloy, consequently in the case of intended use to be able to withstand static pressures of greater than 1 bar at least for a predetermined nominal lifetime. The pressure device can comprise, for example, a pipeline, a tank, a boiler, especially also an autoclave, and/or a measuring tube, respectively a measuring chamber, of a measuring device, for example, a flow measuring device.

The here representatively shown pressure device is formed by means of an in-line measuring device, namely a measuring system insertable into the course of a pipeline (not shown). During operation, at least at times, fluid guided in the pipeline flows through it in such a manner that the fluid first flows into the lumen at the inlet end 100+, flows in a flow direction through the lumen and then leaves the lumen at the outlet end 100#. Said measuring system, consequently the therewith formed pressure device, is, especially, adapted, recurringly to ascertain measured values $X_x$ for at least one, for example, fluid dynamic and/or thermodynamic, measured variable x, such as, for instance, a volume flow rate v, a mass flow rate m, a density ρ, a viscosity η, a pressure p or a temperature ϑ, of the respective fluid flowing through the lumen. The fluid conveying lumen, consequently the wall W surrounding such, is in the case of the pressure device formed in the shown example of an embodiment, namely, for example, as a Coriolis, mass flow, measuring device, density measuring device and/or viscosity measuring device, formed by means of a tube arrangement of the measuring transducer MT (here accordingly embodied as a measuring transducer of vibration-type) having at least one—here sectionally curved—tube 11. In advantageous manner, the tube arrangement, consequently the therewith formed pressure device, is so optimized in the case of a fluid, for example, thus water, flowing in the flow direction through the lumen with an average flow velocity of 10 ms$^{-1}$, a density of 1000 kg m$^{-3}$, respectively a viscosity of 1 cP from the inlet end 100+ to the outlet end 100#, that the fluid experiences a pressure loss of less than 5 bar. Such pressure devices formed by means of a measuring transducer are manufactured and sold by the applicant, for example, as measuring systems working according to the Coriolis principle for measuring mass flow rates under the marks "PROMASS A", "PROMASS E", "PROMASS F", "PROMASS H", "PROMASS I", "PROMASS O", "PROMASS P", "PROMASS S", "PROMASS X" (http://www.de.endress.com/#product/Coriolis).

The measuring transducer serves for registering the at least one measured variable in such a manner that the measuring transducer in interaction with the fluid guided in the lumen generates at least one measurement signal s1, for example, an electrical measurement signal, dependent on the at least one measured variable. In operation of the measuring system shown here, the at least one tube 11 of the measuring transducer serving as measuring tube for the purpose of generating the at least one measurement signal is excited by means of an oscillation exciter acting on the tube actively to cause it to execute mechanical oscillations, for example, bending oscillations about an imaginary oscillation axis, with an instantaneous resonant frequency of the tube arrangement, and the oscillations are converted by means of at least one oscillation sensor reacting to movements of the at least one tube 11 into at least one oscillatory signal serving as measurement signal s1 for the measured variable and having at least one signal parameter, for example, a signal amplitude, a signal frequency or a phase angle, dependent on the measured variable. For the mentioned case, in which the measuring system, consequently the pressure device formed therewith, is a Coriolis, mass flow, measuring device, the measuring transducer includes at least two mutually spaced oscillation sensors for producing two oscillation signals s1, s2 having a mutual phase angle dependent on the mass flow rate.

The measuring transducer shown here is—such as quite usual in the case of commonly marketed measuring transducers of the type being discussed, the more so for such measuring transducers suitable for industrial measuring- and automation technology, not least of all also for measuring transducers of vibration-type,—implemented as a prefabricated, independent structural unit consequently directly insertable into the course of the respective pipeline and having a measuring transducer housing 100 mechanically coupled, respectively, on the inlet and outlet sides—here namely in the region both of the inlet end 100+ as well as also the outlet end 100#—with the tube arrangement and accommodating the tube arrangement, as well as also possibly thereto mounted add-on parts, such as e.g. oscillation sensors, respectively oscillation exciter, in a cavity, especially a cavity hermetically sealed relative to the surrounding atmosphere. For the typical case for pressure devices formed by means of an in-line measuring device, in which case the particular pressure device is to be assembled releasably with the pipeline, there can be provided, as indicated in FIG. 1, respectively 2, respectively directly evident from their combination, on the inlet side, namely in the region of the inlet end 100+ of the pressure device, a first connecting flange 13 for connection to a fluid supplying line segment of the pipeline and on the outlet side, namely in the region of the outlet end 100# of the pressure device, a second connecting flange 14 for a fluid removing line segment of the pipeline. The connecting flanges 13, 14 can, in such case, such as quite usual in the case of such pressure devices, not least of all also in the case of pressure devices formed by means of a measuring transducer of vibration-type, be integrated terminally into the measuring transducer housing 100.

Figure 3:
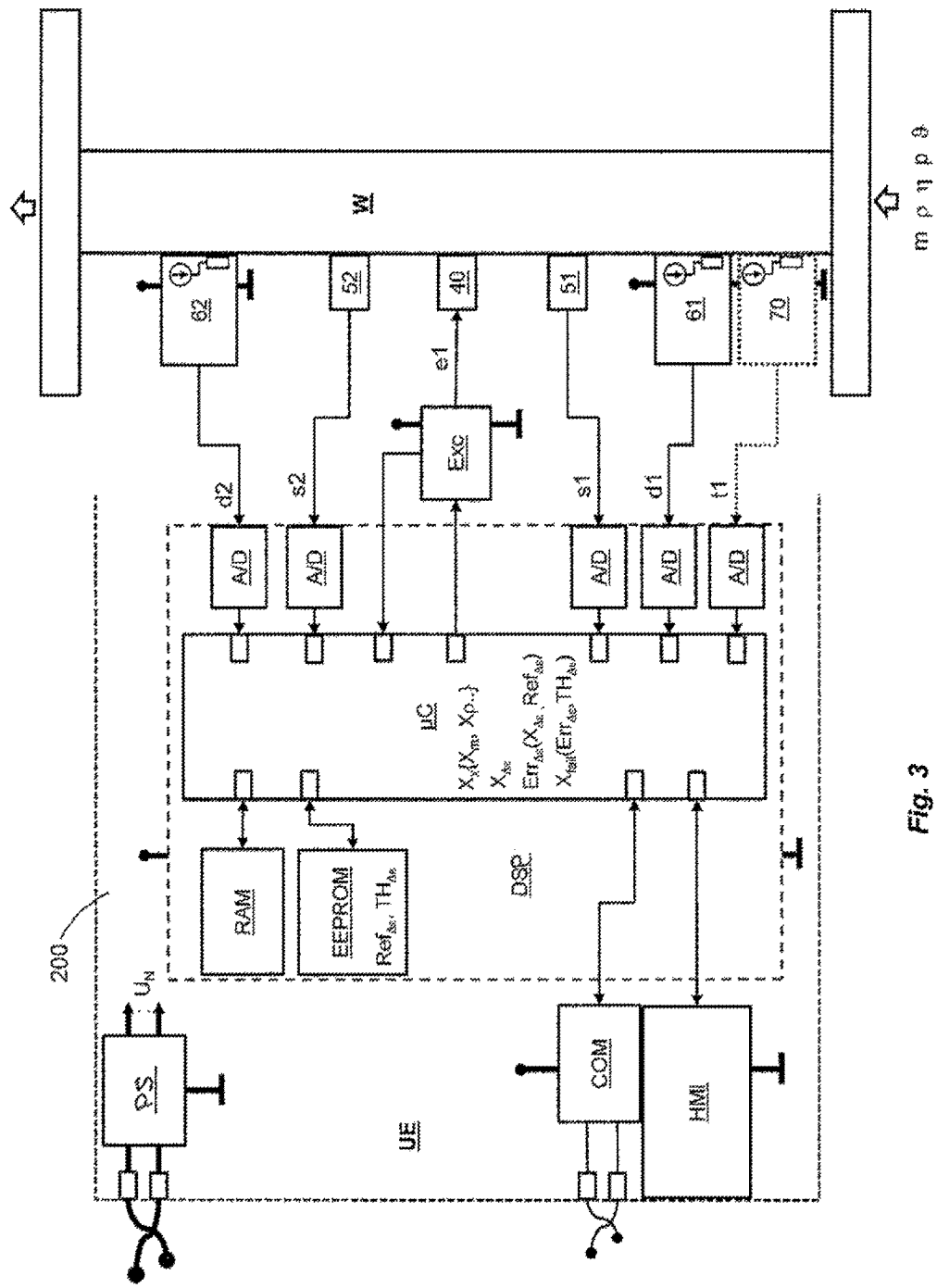
FIG. 3 schematically in the manner of a block diagram, a transmitter electronics with strain sensors connected to it for registering strains of a wall of a pressure device, especially a pressure device according to FIGS. 1, 2.

For evaluating the at least one measurement signal s1 dependent on the at least one measured variable, namely for producing at least one measured value representing the measured variable to be registered by applying the measurement signal, as well as, in given cases, also for activating the measuring transducer, the measuring system, consequently the pressure device formed therewith, includes, furthermore, a transmitter electronics TE electrically coupled with the measuring transducer MT, for example, also via an electrical connection line, and formed, for example, by means of one or more microprocessors, of which an example of an embodiment is shown in FIG. 3 schematically as a type of block diagram. The electrical connecting of the measuring transducer MT to the transmitter electronics TE can occur by means of corresponding connecting lines, which lead out from the electronics-housing 200, for example, by means of a pressure- and/or explosion resistant electrical cable feedthrough, respectively into the measuring transducer housing 100. The transmitter electronics TE can, such as schematically indicated in FIG. 1, respectively FIG. 3, and such as quite usual in the case of measuring systems of the type being discussed, be contained in an impact- and/or pressure resistant, for example, also explosion resistant, electronics-housing 200, which, such as shown, for example, also in the above mentioned US-A 2011/0265580 or US-A 2012/0123705, in forming an in-line measuring device of compact construction, can be held directly on the measuring transducer housing 100, for example, on a corresponding mounting nozzle 100' of the measuring transducer housing 100. In given cases, the mounting nozzle 100' can also accommodate the aforementioned electrical cable feedthrough. The transmitter electronics TE, for example, one supplied with electrical energy during operation externally via a connection cable and/or by means of an internal energy storer, can additionally, such as quite usual in the case of such measuring systems of industrial measuring- and automation technology, be electrically connected via corresponding electrical lines and/or wirelessly per radio with a superordinated electronic measurement data processing system arranged spatially removed, in given cases, also spatially distributed, from the transmitter electronics TE. During operation, measured values produced by the measuring system for the respective measured variable from a measured value signal correspondingly carrying the measured variable are forwarded near in time, for example, also in real time, to the superordinated electronic measurement data processing system.

The transmitter electronics TE communicating with the measuring transducer MT during operation, namely receiving its measurement signals s1, s2 and here additionally also driving the measuring transducer MT via driver signal e1, produces, in the example of an embodiment shown here, by applying the at least one measurement signal s1 repeatedly at least one measured value instantaneously representing the at least one measured variable x, for example, thus a mass flow, measured value $X_m$, a volume flow, measured value $X_v$, a density measured value $X_\rho$, and/or a viscosity measured value $X_\eta$. For such purpose, the transmitter electronics TE includes, as shown schematically in FIG. 3, a driver circuit Exc serving for driving the measuring transducer, here in the form of a measuring transducer of vibration-type, as well as a measuring- and evaluating circuit DSP for processing measurement signals s1, s2, of the measuring transducer MT and, for example, during operation, directly communicating with the driver circuit Exc. During operation, the measuring- and evaluating circuit DSP delivers measured values $X_x$ representing the at least one measured variable x. Each of the measurement signals $s_1$, $s_2$ delivered by the measuring transducer MT is fed via its own analog-to-digital converter A/D to the measuring- and evaluating circuit DSP in the example of an embodiment shown here implemented, for example, by means of a microprocessor μC and/or by means of a digital signal processor as well as by means of corresponding analog-to-digital converters A/D for digitizing the measurement signals, corresponding non-volatile memory EEPROM for the persistent storage of programs for the microprocessor and/or operating parameters of the measuring system as well as corresponding volatile memory RAM for storing program code to be executed and/or digital measured values.

In the example of an embodiment shown here, the measuring- and evaluating circuit DSP of the transmitter electronics TE serves, among other things, also for applying the measurement signals $s_1$, $s_2$ delivered by the measuring transducer MT, for example, based on a phase difference detected between the measurement signals $s_1$, $s_2$, recurringly to ascertain a mass flow, measured value $X_m$, which represents a mass flow rate of the fluid flowing in the measuring transducer. Alternatively or supplementally for ascertaining the mass flow, measured value $X_m$, the transmitter electronics TE of the measuring system shown here can also serve, derived from an instantaneous oscillation frequency of the vibrating tube 11 ascertained based on the measurement signals s1, s2 or, for example, also based on the exciter signal e1, to produce a density measured value, which represents a density of the fluid flowing in the measuring transducer. Furthermore, the transmitter electronics TE can, such as quite usual in the case of such measuring systems, in given cases, also be used to ascertain a viscosity measured value $X_\eta$ representing a viscosity of the fluid flowing in the measuring transducer; compare, for this, also the above referenced U.S. Pat. Nos. 5,796,011, 7,284,449, 7,017,424, 6,910,366, 6,840,109, 5,576,500, or 6,651,513. Suited, in such case, for ascertaining the exciter energy or excitation power, respectively damping, required for determining the viscosity is, for example, the exciter signal delivered by the driver circuit of the transmitter electronics and/or also an internal control signal of the transmitter electronics serving for tuning the driver signal.

For visualizing, on-site, measured values $X_x$ internally produced by the measuring system and/or, in given cases, measuring system internally generated status reports, such as, for instance, an error report and/or an alarm, the measuring system can have, furthermore, communicating with the transmitter electronics TE, a display- and servicing element HMI, such as an LCD-, OLED- or TFT display, for instance, placed behind a correspondingly provided window in the electronics housing 200, plus a corresponding input keypad and/or touch screen. Moreover, provided in the transmitter electronics TE, for example, a re-programmable and/or remotely parameterable, transmitter electronics TE, are other electronic components serving the operation of the measuring system, such as, for instance, an internal energy, power supply circuit PS formed, for example, by means of a switching power supply, for providing internal supply voltages $U_N$, or also a communication circuit COM serving for connecting to a superordinated measurement data processing system and/or to a fieldbus. In advantageous manner, the communication circuit COM can, for example, also be adapted such that the transmitter electronics TE formed therewith can exchange with a electronic measurement data processing system superordinated to it, for example, a programmable logic controller (PLC), a personal computer and/or a process-control system measuring- and/or other operating data, such as, for instance, current measured values or tuning- and/or diagnostic values serving for control of the measuring system during operation, via a data transmission network—wired and/or radio-based—provided within the superordinated data processing system, for example, a fieldbus and/or industrial radio network. Additionally, for example, the internal energy supply circuit PS can also be fed during operation by an external energy supply provided in the data processing system.

As already mentioned, the walls of pressure devices of the type being discussed can, as a result of overloadings, be it from operating the respective pressure device with process parameters exceeding earlier agreed, limit values—such as, for instance, a too high operating pressure, a too high operating temperature and/or a too high flow velocity—or also from supplying with a fluid unsuited for the pressure device, for example, a fluid abrading the wall and/or chemically attacking the wall, be damaged at least partially in considerable measure; this, in given cases, also in such a manner that the pressure device—, for instance, as a result of a plastic deformation of the wall and/or, as shown schematically in FIG. 4a, as a result of a wear $\Delta w$ of the wall, namely a material removal from its surface facing the lumen, along with a lessening wall thickness of the wall—has then a lessened pressure resistance, respectively, in the case, in which the pressure device is embodied as a measuring system, then a lessened accuracy of measurement.

In order as early as possible to be able to detect such damage to the wall W, for example, also already in a beginning stage, namely before the damage to the pressure device as regards its (still remaining) pressure resistance or, in given cases, as regards its (still remaining) accuracy of measurement has reached the critical stage, respectively in order to be able to safely report such damage, not least of all also while preventing possible false alarms, the measuring system, consequently the therewith formed pressure device, is, especially, also adapted to register both a strain $\varepsilon_1$ of a first wall segment WS1 of the wall W as well as also a strain $\varepsilon_2$ of at least a second wall segment WS2 of the wall spaced from the first wall segment WS1, in order to ascertain, derived therefrom, a strain deviation value $X_{\Delta\varepsilon}$, for example, a digital, strain deviation value $X_{\Delta\varepsilon}$, representing a strain difference $\Delta\varepsilon$, namely a difference $\varepsilon_1 - \varepsilon_2$ (respectively, $\varepsilon_2 - \varepsilon_1$) between the strain $\varepsilon_1$ of the first wall segment WS1 and the strain $\varepsilon_2$ of the second wall segment WS2, respectively a strain quotient, namely a quotient $\varepsilon_1/\varepsilon_2$ (respectively, $\varepsilon_2/\varepsilon_1$) between the strain $\varepsilon_1$ of the first wall segment WS1 and the strain $\varepsilon_2$ of the second wall segment WS2.

By exploiting a dependence, naturally inherent to the wall, of the strain difference $\Delta\varepsilon$ on the extent of damage to the wall in the case of a wear $\Delta w$, namely, for example, in such a manner that, as well as also shown in FIG. 4b, by way of example, the strain difference $\Delta\varepsilon$, for example, as a result of supplying the wall with a pressure lying above 1 bar, rises with increasing wear $\Delta w$, the measuring system is additionally adapted to ascertain the damage to the wall using the strain deviation value $X_{\Delta\varepsilon}$; this e.g. in such a manner that, based on an increasing of the strain deviation value $X_{\Delta\varepsilon}$ observed in an observation time span and/or by ascertaining a significant deviation of the strain deviation value $X_{\Delta\varepsilon}$ from a predetermined desired- or reference value, damage to the wall is deduced.

The strain of the wall segments WS1, WS2 required for ascertaining damage to the wall can be effected during operation of the pressure device e.g. by changing a pressure difference (relative pressure $p_{rel}$) existing between a static internal pressure p+ reigning within the lumen and an ambient pressure p− acting externally on the wall, whereby at least portions of the wall, namely at least the first wall segment WS1 and at least the second wall segment WS2, are elastically deformed. Since pressure devices of the type being discussed are, such as already mentioned multiple times, adapted to convey within the respective lumen a fluid, which has a pressure value p+ lying at least 0.5 bar above the ambient pressure p−, it can be directly assumed therefrom that during operation of the respective pressure device regularly such a pressure difference is present, namely a pressure difference sufficient for ascertaining damage to the wall based on an elastic deformation of the wall, this not least of all also for the case in the shown example of an embodiment, in which the pressure device is formed by means of at least one measuring tube for conveying flowing fluid. It can also, in such case, be directly assumed therefrom that alone already through the operational supplying, respectively draining, of the fluid in the case of such pressure devices such means that an increase of the pressure difference sufficient for the detection of possible damage to the wall is present, respectively that it is, as a rule, sufficient for increasing the static internal pressure reigning within the lumen to the higher pressure value simply to allow fluid to flow through the lumen of the pressure device with the nominal operating pressure. As already indicated, the pressure values for the internal pressure p+ in the case of pressure devices of the type being discussed, not least of all also in the case of pressure devices formed by means of at least one measuring tube for conveying flowing fluid, lie in normal operation namely typically, at least at times, clearly above 10 bar. For the other mentioned case, in which the wall of the pressure device has experienced a plastic deformation, consequently a non-reversible deformation, the strain difference $\Delta\varepsilon$, respectively the strain deviation value $X_{\Delta\varepsilon}$ representing this, contains, besides a component corresponding to the elastic deformation of the wall as a result of the pressure difference, consequently a component fluctuating with time, additionally, in each case, also a component largely independent of the instantaneous pressure difference, consequently a non-volatile component, whose height corresponds to an extent of the plastic deformation of the wall, plus a possible prestress of the strain sensor.

For registering the aforementioned expansions of the wall, the measuring system of an embodiment of the invention comprises a first strain sensor 61 affixed on the wall segment WS1—and formed, for example, by means of a resistive or piezoresistive strain gage (SG)—for producing a first strain signal d1 dependent on the strain of the mentioned wall segment WS1 and at least a second strain sensor 62 affixed on the wall segment WS2 spaced from the wall segment WS1—and formed, for example, by means of a resistive or piezoresistive strain gage and/or constructed equally to the first strain sensor—for producing a second strain signal d2 dependent on the strain of the wall segment WS2. Strain signals d1, respectively d2, can, in such case, e.g., in each case, be a (firstly) analog electrical signal having an electrical voltage dependent on the respectively to be registered strain and/or an electrical current dependent on said strain. Each of the strain sensors 61, 62 can be formed, for example, by means of a strain gage (SG) adhered externally on the particular wall segment WS1, respectively WS2, namely on a surface facing away from the lumen, consequently a surface not contacted by the fluid guided therein, and having, in each case, a predetermined nominal resistance value $R_0$ (nominal resistance) of, for example, 500$\Omega$(ohm), and a predetermined sensitivity k (k-factor) of, for example, 100. Both the strain gage forming the strain sensor 61 as well as also the strain gage forming the strain sensor 62 can, in advantageous manner, furthermore, be so arranged that each of the two strain gages, in given cases, also strain gages, in each case, held under prestress, registers primarily an azimuthal strain of the respective wall segment WS1, respectively WS2, namely a strain corresponding to a circumferential change, respectively oriented in a circumferential direction; alternatively thereto, it is possible, however, also to arrange at least one, or also each, of the strain gages such that therewith primarily an axial strain is registered, namely strain in a longitudinal direction of the lumen surrounded by the wall—in the example of an embodiment shown here thus also oriented in the flow direction.

For producing the respective strain signal d1, respectively d2, each of the two, for example, equally-constructed, strain gages (SG) can during operation be flowed through by an electrical current $I_{SG}$ driven from a constant current source (so that the electrical current is known), provided, for example, in the respective strain sensor, in such a manner that an electrical voltage $U_{SG1}$, respectively $U_{SG2}$, falling across the respective strain gages serves as strain signal d1, respectively d2. With knowledge of the dependence, $U_{SG1}=I_{SG}\cdot R_0 (1+k\cdot\varepsilon_1)$, respectively $U_{SG2}=I_{SG}\cdot R_0 (1+k\cdot\varepsilon_2)$, for such strain sensors of the respective instantaneous voltage $U_{SG1}$, respectively $U_{SG2}$, on the respective instantaneously registered strain, then the particular strain can also be directly numerically ascertained, consequently quantified. Alternatively or supplementally to this evaluation of firstly separately digitized strain signals d1, d2, the ascertaining of the strain deviation value $X_{\Delta\varepsilon}$ can, for example, also occur by forming a Wheatstone measuring bridge by means of the two strain sensors 61, 62,—, for example, formed, in each case, as a strain gage (SG)—plus corresponding reference resistances, in such a manner that the Wheatstone measuring bridge is driven by a correspondingly provided reference voltage and a diagonal voltage of the measuring bridge, respectively a digital value derived therefrom, represents the strain difference $\Delta\varepsilon$.

The strain sensors 61, 62 are, as schematically shown in FIG. 2 or 3, respectively as directly evident from the combination of these figures, electrically coupled with the transmitter electronics TE, here namely with its measuring- and evaluating circuit DSP. The transmitter electronics TE is in the case of this embodiment of the invention, furthermore, adapted, for example, by corresponding programming of the measuring- and evaluating circuit DSP, to receive both the strain signal d1 as well as also the strain signal d2, as well as with application of both the strain signal d1 as well as also the strain signal d2, to ascertain damage to the wall; this, especially, in such a manner that the transmitter electronics TE by means of the strain signals d1, d2, firstly ascertains the strain deviation value $X_{\Delta\varepsilon}$ and this is then used to detect damage to the wall, respectively to ascertain the extent of the damage. In the example of an embodiment shown here, each of the strain signals d1, d2 is fed to its own analog-to-digital converter A/D for the purpose of converting the strain signals d1, d2 into sampling sequences serving as digital strain signals, of which analog-to-digital converters A/D the one receiving the strain signal d1 delivers a sampling sequence representing the strain signals d1, respectively the other receiving the strain signal d2 delivers a sampling sequence representing the strain signal d2; alternatively, each of the strain signals can also be fed via a multiplexer sequentially to one and the same analog-to-digital converter A/D and therewith sequentially converted into the respective sampling sequence. The strain deviation value $X_{\Delta\varepsilon}$ can be ascertained based on the two strain signals, for example, by ascertaining, both from the strain signal d1 as well as also from the strain signal d2, in each case, at least one parameter measured value for a signal parameter characterizing the particular strain signal, not least of all, however, also correlated as well as possible with the naturally time variable strain $\varepsilon_1$, respectively $\varepsilon_2$, for example, thus a signal parameter value in the form of an instantaneous value of each of the two strain signals, and then a difference and/or a quotient of the parameter measured values is formed and used as strain deviation value $X_{\Delta\varepsilon}$. Serving as signal parameters can be, instead of the instantaneous value, in such case, however, also other location parameters, such as e.g. an effective value (RMS), and/or also scatter parameters, such as e.g. a variance of each of the two strain signals. The measuring- and evaluating circuit DSP is, consequently, according to an additional embodiment, additionally adapted, based on the mentioned sampling sequences, in each case, first to ascertain a digital strain value $X_{\varepsilon 1}$ representing the strain $\varepsilon_1$, for example, in the form of a time average, as well as a digital strain value $X_{\varepsilon 2}$ representing the strain $\varepsilon_2$, for example, also in the form of a time average, and then to form therewith the strain deviation value $X_{\Delta\varepsilon}$ as a difference $X_{\varepsilon 1}-X_{\varepsilon 2}$ (respectively, $X_{\varepsilon 2}-X_{\varepsilon 1}$) and/or as a quotient $X_{\varepsilon 1}/X_{\varepsilon 2}$ (respectively, $X_{\varepsilon 2}/X_{\varepsilon 1}$) of the mentioned strain values $X_{\varepsilon 1}$, $X_{\varepsilon 2}$ and/or as a difference of the strain values normalized on one of the strain values $X_{\varepsilon 1}$, $X_{\varepsilon 2}$, for example, in form $(X_{\varepsilon 1}-X_{\varepsilon 2})/X_{\varepsilon 1}=1-X_{\varepsilon 2}/X_{\varepsilon 1}$.

The ascertaining of damage to the wall with application of the strain deviation value $X_{\Delta\varepsilon}$ can occur e.g. from the strain deviation value $X_{\Delta\varepsilon}$ by means of the measuring- and evaluating circuit DSP by taking into consideration an earlier ascertained, initial strain difference $\Delta_{\varepsilon 0}$ as reference value, for instance, by a simple comparison with the same and/or by ascertaining a deviation of the instantaneous strain difference from the mentioned initial strain difference. The initial strain difference can be ascertained for the particular pressure device e.g. during a calibrating of the pressure device in the manufacturer's plant and/or at start-up on-site, consequently with (still) undamaged wall, and thereafter stored in the transmitter electronics TE, for example, in the mentioned non-volatile memory EEPROM of the measuring- and evaluating circuit DSP; alternatively or in supplementation, the initial strain difference can, however, also be ascertained for a structurally equal or at least equal type, other pressure device, for example, in the manufacturer's plant, and thereafter correspondingly transmitted to the transmitter electronics, respectively to the transmitter electronics of other type-equal or equally constructed pressure devices.

In an additional embodiment of the invention, it is, furthermore, provided, based on the ascertained damage, namely for the case, in which the damage exceeds a critical measure predetermined for the pressure device, to generate a corresponding warning report $X_{fail}$ namely signaling, also visually and/or acoustically perceivably, for example, a critical damage to the wall. Critical damage can be, for example, a damage corresponding to an earlier established, maximum allowable damage to the wall of the pressure device and/or damage requiring an inspection of the pressure device. The warning report $X_{fail}$ can in the example of an embodiment shown here be produced by means of the measuring- and evaluating circuit DSP and output via the display- and servicing element HMI and/or via the communication circuit COM.

In an additional embodiment of the invention, it is, furthermore, provided that damage to the wall is ascertained quantitatively, in that, based on the strain signals d1, d2, respectively the strain deviation value $X_{\Delta\varepsilon}$, a damage value $Err_{\Delta\varepsilon}$ is ascertained, namely a characterizing number value for a damage characterizing number quantifying damage to the wall. The damage characterizing number can be defined e.g. as an—absolute or relative—deviation of the strain difference from an earlier ascertained, pressure device specific, reference value $Ref_{\Delta\varepsilon}$. In advantageous manner, the damage characterizing number can, in such case, e.g. be so defined that, as well as also shown simplified in FIG. 4b, the damage value $Err_{\Delta\varepsilon}$ likewise increases with increasing damage. Said reference value $Ref_{\Delta\varepsilon}$ can, such as already indicated, correspond e.g. to the previously mentioned, initial strain difference, consequently ascertained in the aforementioned manner earlier for the particular pressure device with undamaged wall or earlier on an equally-constructed, other pressure device and thereafter furnished in the transmitter electronics TE, for example, in the non-volatile memory EEPROM. Alternatively thereto, however, for example, also one of the two mentioned strain values $X_{\varepsilon 1}$, $X_{\varepsilon 2}$ can serve as a reference value $Ref_{\Delta\varepsilon}$, for example, that, which represents the strain of the regularly scarcely damaged one of the two wall segments WS1, WS2, respectively in a comparison of the two wall segments WS1, WS2 the typically less damaged wall segment. In the case of the situation illustrated in FIG. 4a, thus, for example, the strain value $X_{\varepsilon 1}$ derived from the strain signal d1, consequently the strain value $X_{\varepsilon 1}$ representing the strain $\varepsilon 1$ of the wall segment WS1, is especially suitable for use as reference value $Ref_{\Delta\varepsilon}$ ($X_{\varepsilon 1} \rightarrow Ref_{\Delta\varepsilon}$).

For the mentioned case, in which the damage characterizing number is defined as a relative deviation of the strain difference from the earlier ascertained, pressure device specific, reference value $Ref_{\Delta\varepsilon}$, the damage value $Err_{\Delta\varepsilon}$ can, for example, be so calculated by means of the measuring- and evaluating circuit DSP, consequently the transmitter electronics can, furthermore, be so adapted, that the particular damage value $Err_{\Delta\varepsilon}$ fulfills the condition:

$$Err_{\Delta\varepsilon} = 1 - \frac{X_{\Delta\varepsilon}}{Ref_{\Delta\varepsilon}}.$$

Alternatively or supplementally, the damage value $Err_{\Delta\varepsilon}$ can, however, also be so calculated by means of the measuring- and evaluating circuit DSP, consequently the transmitter electronics TE can, furthermore, also be so adapted, that the damage value $Err_{\Delta\varepsilon}$ fulfills the condition:

$$Err_{\Delta\varepsilon} = Ref_{\Delta\varepsilon} - X_{\Delta\varepsilon},$$

and, consequently corresponds to an absolute deviation of the strain deviation value $X_{\Delta\varepsilon}$ from the associated reference value $Ref_{\Delta\varepsilon}$. The damage value $Err_{\Delta\varepsilon}$ can then also be used to ascertain whether or not damage to the wall has already taken place, respectively also to ascertain how much damage has in the meantime accumulated. Additionally, it can, furthermore, also be detected by means of the respectively current damage value $Err_{\Delta\varepsilon}$ whether the damage to the wall already corresponds to the critical damage to the wall earlier established for the particular pressure device, for example, by comparing, for example, also directly in the measuring- and evaluating circuit DSP, the particular damage value $Err_{\Delta\varepsilon}$ with a correspondingly predetermined threshold value $TH_{\Delta\varepsilon}$ representing the critical damage. Said threshold value $TH_{\Delta\varepsilon}$ can be ascertained, for example, earlier by means of a type-equal or equally-constructed, other pressure device, which, however, already has damage classified as critical damage, in that by means of its measuring- and evaluating circuit at least one damage value $Err_{\Delta\varepsilon}$ representing its damage is ascertained, especially also stored, and thereafter correspondingly furnished as threshold value $TH_{\Delta\varepsilon}$ in the measuring- and evaluating circuit DSP, for example, also in the mentioned non-volatile memory EEPROM, of the pressure device to be monitored. To the extent, that an exceeding, respectively subceeding, of the threshold value $TH_{\Delta\varepsilon}$ is reflected by the damage value $Err_{\Delta\varepsilon}$, this can, furthermore, be signaled correspondingly, namely, for example, in the form of the mentioned warning report $X_{fail}$.

The aforementioned calculational functions, especially also those serving, in each case, for producing the damage value $Err_{\Delta\varepsilon}$ and/or the alarm $X_{fail}$, respectively others of the aforementioned measured values, can be implemented very simply e.g. by means of the above mentioned microcomputer of the measuring- and evaluating-circuit DSP or, for example, also by means of a digital signal processor correspondingly provided therein. The creation and implementing of corresponding algorithms, which correspond to the above-described formulas, as well as their conversion into corresponding program code executable in the transmitter electronics TE is known, per se, to those skilled in the art and need, consequently,—, in any event, with knowledge of the present invention—no detailed explanation. Of course, the aforementioned formulas, respectively other functionalities of the measuring system, implemented with the transmitter electronics TE, respectively the pressure device formed therewith, can also be implemented quite directly or partially by means of corresponding discretely constructed and/or hybrid, thus mixed analog-digital, calculational circuits in the transmitter electronics TE.

Fundamentally, there are in the case of pressure devices of the type being discussed a number of options for selecting mutually spaced wall segments as wall segment WS1, respectively wall segment WS2, consequently as sites for placing the strain sensor 61, respectively the strain sensor 62. Quite suitable for monitoring of the respective pressure device, are, such as already mentioned, for example, wall segments, which react to loading scenarios typical for the particular pressure device regularly with mutually differing local damage, for example, in such a manner that one of the selected wall segments is always damaged faster (than the respectively other wall segment) within a predeterminable observation time span, respectively at a predeterminable observation point in time is more strongly damaged (then the respectively other wall segment). Examples of mutually differing local damage for pressure devices of the type being discussed can include, for example, damage to the respective wall segments having mutually differing damage pictures and/or mutually differing degrees of damage. Wall segments suitable for monitoring of the wall can in the case of pressure devices having a lumen operationally flowed through by fluid include, for example, wall segments, which, as also shown schematically in FIG. 4a, are arranged mutually spaced relative to the flow direction of the fluid, for example, in such a manner that the wall segment WS1 is arranged upstream of the wall segment WS2. Moreover, having proved suitable for ascertaining possible damage, not least of all for the case shown here, in which the lumen is formed by means of a tube arrangement of a measuring transducer, are also such wall segments, which, as schematically indicated in FIG. 5, respectively 6, directly adjoin an arc shaped segment, or an elbow formed therewith, of the respective tube arrangement, and/or are arranged on mutually opposing sides of one and the same (measuring-) tube. Such arrangements of the at least two strain sensors 61, 61 are well suited, not least of all, also for such loading scenarios, in which an increased wear of the wall results from a partial grinding off of the wall by a dispersion flowing at least, at times, in the lumen of the pressure device and/or in which plastic deformations of the walls are of concern. Thus, for example, dispersions, namely a disperse phase entrained in the respective dispersion medium, for example, thus solid particles entrained in a gas or—such as shown schematically in FIG. 4a—gas bubbles entrained in a liquid, tend in the course of the respective flow, at times, to accumulate reinforced within certain regions, respectively the concentration partially to increase, for instance, also due to cavitation, sedimentation or precipitation; this, especially, in such a manner that, as well as also schematically shown in FIG. 4a, with a certain regularity one of the wall segments WS1, WS2 of the wall—in FIG. 4a namely the wall segment WS1—is contacted principally by the dispersion medium, while the respectively other of the wall segments WS1, WS2—in FIG. 4a thus the wall segment WS2—is frequently, respectively to a stronger extent, supplied with the dispersed phase and, consequently, is damaged more strongly during operation. This effect is observed to a special degree in the case of flowing dispersions in pipe arrangements with sectionally curved pipes and/or in pipe arrangements having abrupt cross sectional changes, for example, as a result of a diffuser.

Figure 7:
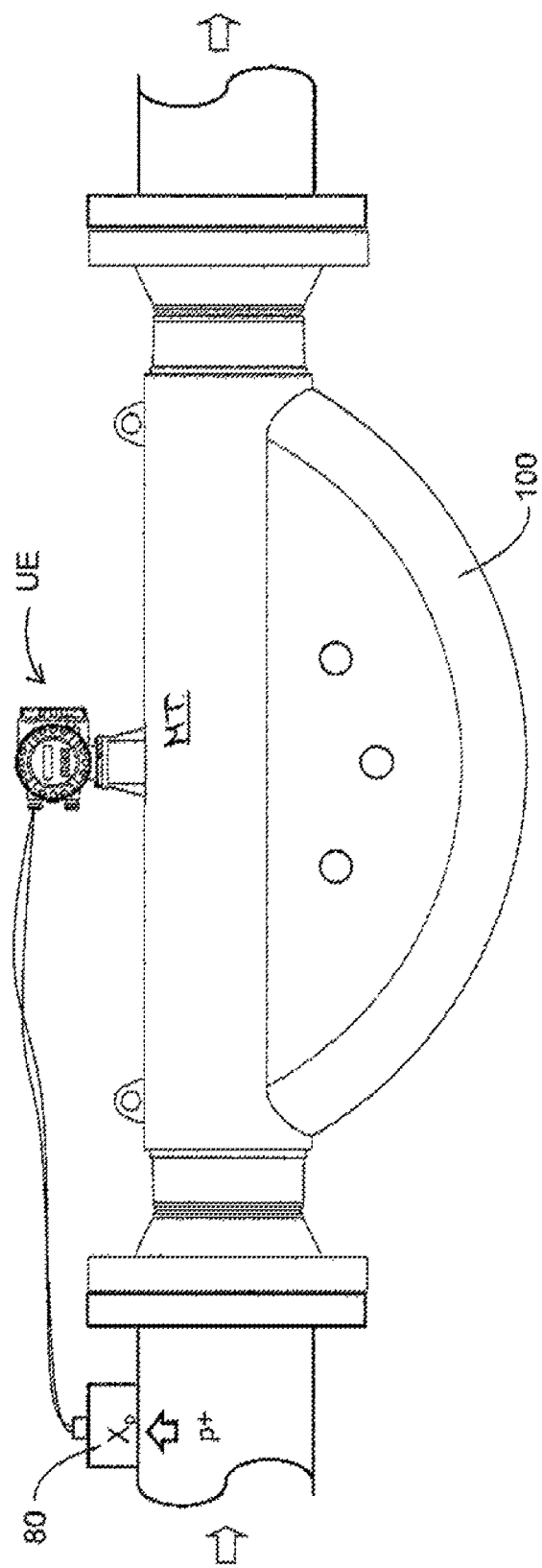
FIG. 7 a pressure device according to FIGS. 1, 2, respectively 3, comprising a pressure sensor electrically connected with the transmitter electronics.

Although the monitoring of the wall of the pressure device by registering the strain of only the two wall segments WS1, WS2, respectively by applying only two correspondingly placed strain sensors 61, 62, can be implemented for most cases of application with sufficient accuracy, respectively safety, it can, at times, be advantageous, respectively required, for example, in order to be able to detect the degree of the respective damage more finely stepped, respectively in order to be able to register individual damage pictures separately from one another and to evaluate them separately, to register the strain of three or more mutually spaced, respectively selected, wall segments WS1, WS2, WS3, WS4, e.g. arranged in the manner shown representatively in FIG. 6, and to evaluate them correspondingly by means of the respective measuring- and evaluating circuit DSP. Moreover, it is additionally also an option, instead of the constellations shown in FIGS. 3, 5, respectively 6, in which thus the tube arrangement of the measuring transducer includes each of the wall segments, of which a respective strain is registered for the purpose of ascertaining damage to the wall W, consequently both the wall segment WS1 as well as also the wall segment WS2, to locate at least one wall segments WS1, WS2 outside of the tube arrangement, for example, by placing the strain sensor 61 outwardly on a pipe wall of a line segment of the connected pipeline supplying fluid to the measuring transducer or draining fluid from the measuring transducer. Furthermore, it can, not least of all for the case, in which the wall segments WS1, WS2 experience during operation mentionable temperatures, respectively time changes of the same, namely temperatures no longer negligibly influencing the strain signals delivered from the respective strain sensors, be of advantage, especially for the case, in which the strain sensors are not temperature compensated, supplementally to register also a temperature of the wall, for instance, in the immediate vicinity of one of the wall segments WS1, WS2, for example, by means of a temperature sensor 70 in the form of a platinum resistor and/or thermocouple adhered to a side of the wall W facing away from the lumen and delivering a corresponding temperature signal t1 to the measuring- and evaluating circuit DSP, and to ascertain damage to the wall also with application of the temperature signal t1, for example, in that the measuring- and evaluating circuit DSP compensates possible temperature dependences of the strain signals d1, d2 based on the temperature signal t1. Moreover, it can be of advantage, when—alternatively or in supplementation to the above indicated temperature compensation—for the purpose of ascertaining damage to the wall, supplementally also a static internal pressure reigning within the lumen is registered, for example, absolutely or relatively to the ambient pressure, for example, such as schematically shown in FIG. 7, by means of an (absolute-, respectively relative-) pressure sensor inserted into the wall upstream of the wall segments WS1, WS2 and communicating with the measuring- and evaluating circuit DSP via a communication circuit COM or, for example, also via a HART multidrop, in order to provide in the measuring- and evaluating circuit DSP a pressure measured value $X_p$ representing the pressure. For example, the above mentioned reference value $Ref_{\Delta\epsilon}$ can additionally be calculated with application of the pressure measured value, for example, according to a calculational specification $Ref_{\Delta\epsilon}=X_p \cdot K_p$, respectively $Ref_{\Delta\epsilon}=X_p \cdot \Delta\epsilon_0/X_{p,0}$, co-determined also by a proportionality factor $K_p$ mediating between the initial strain difference and a concurrently measured static internal pressure $X_{p,0}$, respectively the above mentioned damage value $Err_{\Delta\epsilon}$ can be pressure compensated, namely largely independently of the instantaneous static internal pressure, respectively ascertained from the pressure difference established thereby. For the mentioned case, in which the pressure device is formed by means of an in-line measuring device for measuring a mass—, respectively volume, flow rate, the mentioned pressure measured value $X_p$ can also be converted to a pressure acting on the first, respectively second, wall segment, for example, based on the measuring method shown in the above mentioned US-A 2011/0161018.

Figure 8:
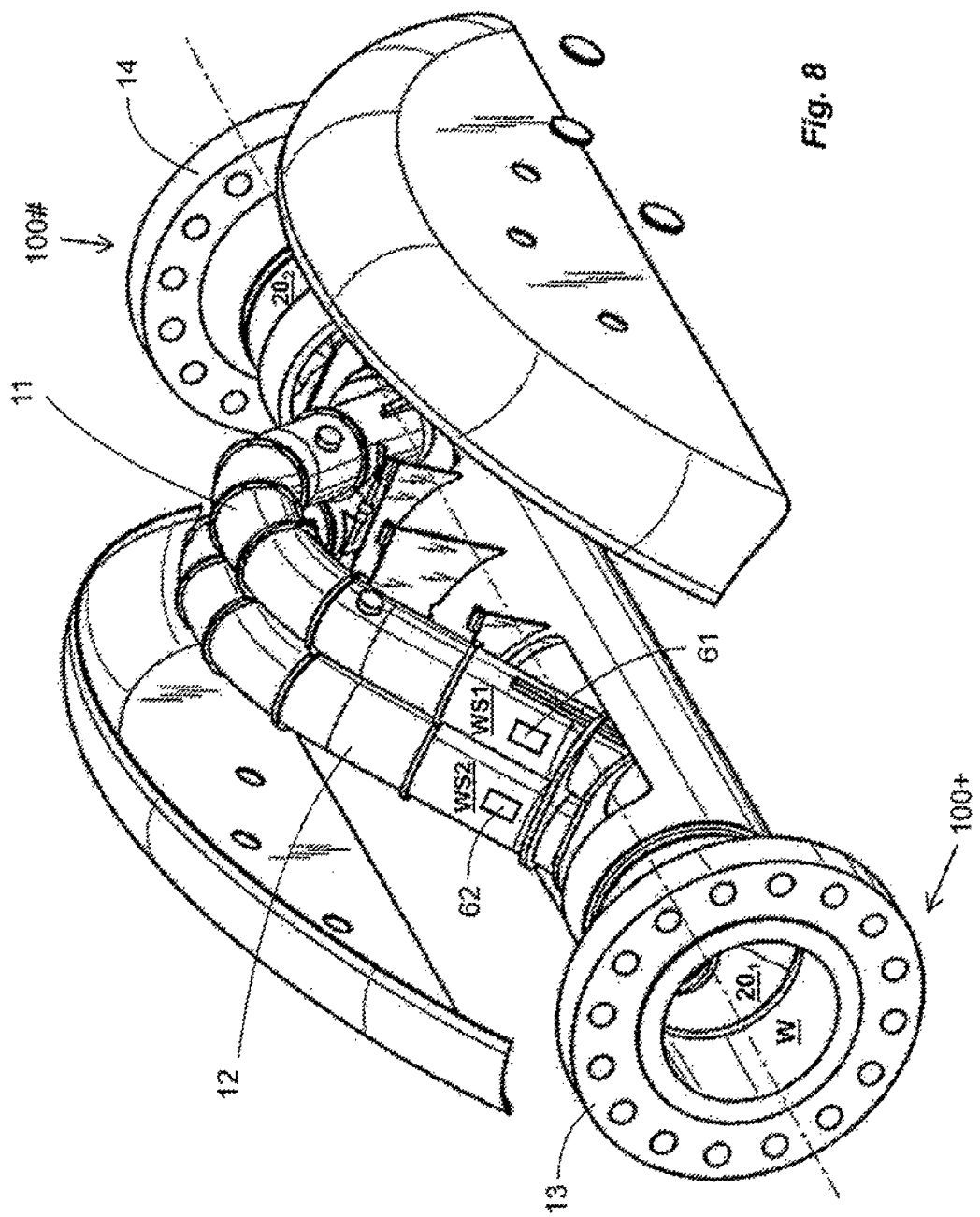
FIG. 8 another variant of a pressure device in perspective side view.
Figure 9:
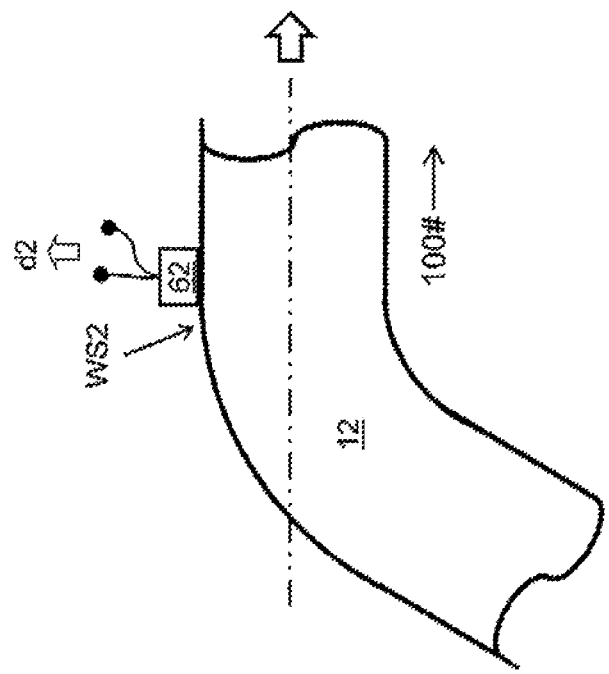
FIG. 9 variants for an arrangement of strain sensors on walls of a pressure device according to FIG. 8.
Figure 9:
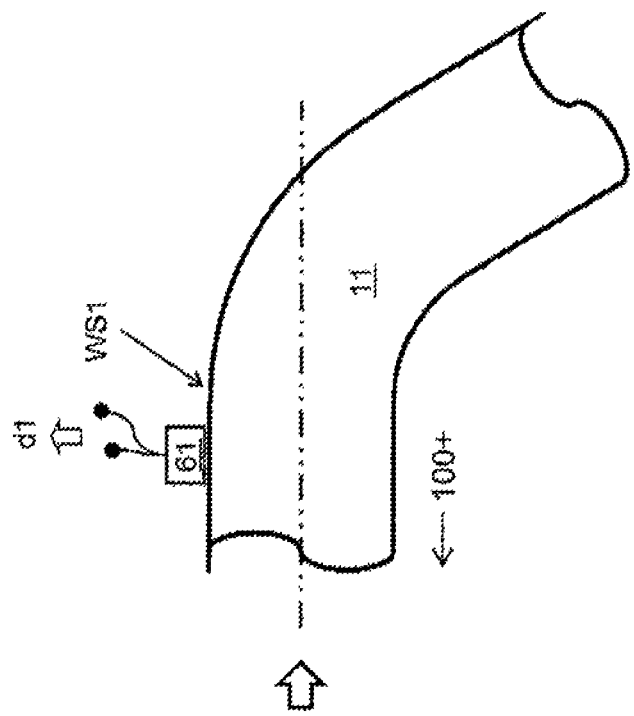

A further example of an embodiment of a pressure device suitable for implementing the present invention is shown in FIG. 8. In the case of this variant, the fluid conveying lumen of the pressure device, which is again a measuring transducer of vibration-type, is formed by a tube arrangement having supplementally to the (first) tube 11 at least one other (second) tube 12. The at least two tubes 11, 12 are connected to form flow paths providing parallel flow. Thus, inflowing fluid is divided into two flow portions by an inlet-side, first flow divider $20_1$ and outgoing fluid is guided back together by an outlet-side, second flow divider $20_2$. Each of the two flow dividers $20_1$, $20_2$ includes therefor a first flow opening, which opens into the first of the at least two (measuring-) tubes, as well as a second flow opening, which opens into the second of the at least two (measuring-) tubes. In the case of the variant shown in FIG. 8 with a pressure device formed of at least two tubes providing parallel flow, it is then also an option to affix the second strain sensor not on the same tube as that on which the first strain sensor is affixed, respectively to have the wall segment WS1 be a part of the (measuring-) tube 11 and the wall segment WS2 be a part of the (measuring-) tube 12. This can occur, for example, by affixing the strain sensor 61, such as already mentioned, on the tube 11 and affixing the strain sensor 62 on the tube 12, for example, in such a manner that, as a result, the wall segment WS1—such as indicated in FIG. 8—is located the same distance from the inlet end 100+ as the wall segment WS2. Alternatively thereto, the two strain sensors 61, 62 can, for example, also be so placed on the wall that the two wall segments WS1, WS2 are located different distances from the inlet end 100+ and/or different distances from the outlet end 100#, for example, also in such a manner that—such as shown schematically in FIG. 9—the wall segment WS1 is spaced the same distance from the inlet end 100+ as the wall segment WS2 is from the outlet end 100#. It is noted here, supplementally, that—although in the example of an embodiment of shown in FIG. 8, the measuring transducer, respectively the pressure device formed therewith, has two curved tubes, and, consequently, corresponds in its mechanical construction essentially to the measuring transducers proposed in US-A 2005/0072238 or U.S. Pat. No. 5,796,011, respectively also to those buyable from the applicant under the marks "PROMASS E" or "PROMASS F"—the invention can also be applied correspondingly in pressure devices formed with straight and/or more than two (measuring-) tubes, for example, thus four parallel tubes, for instance, comparable to the measuring transducers shown in the above mentioned US-A 2011/0265580, U.S. Pat. No. 5,602,345 or WO-A 96/08697 or also those buyable from the applicant under the marks "PROMASS M" or "PROMASS X".

The invention claimed is:

1. A method for monitoring and/or checking a pressure device for conveying and/or storing a fluid a lumen surrounded by a wall and for measuring at least one physical measured variable of said fluid, said pressure device including a first strain sensor affixed on a first wall segment of the wall, a second strain sensor affixed on a second wall segment of the wall spaced from the first wall segment, and a measuring transducer for delivering at least one measurement signal corresponding to said measured variable, said measuring transducer including a tube arrangement, an oscillation exciter, at least one oscillation sensor, and measuring transducer housing forming a cavity accommodating said tube arrangement, said oscillation exciter and said at least one oscillation sensor, said tube arrangement including at least one tube for conveying the fluid and said tube arrangement forming said lumen, said method comprising:

using the oscillation exciter for causing said at least one tube to execute mechanical oscillations;

allowing, for increasing a static internal pressure reigning within the lumen to a pressure value higher than ambient pressure, fluid to flow through said lumen of the pressure device such that said first wall segment is arranged upstream of said second wall segment relative to a flow direction of the fluid;

using the at least one oscillation sensor to convert movements of said at least one tube into at least one oscillatory signal showing at least one signal parameter dependent on the at least one physical measured variable;

using the first strain sensor for registering a strain of said first wall segment of the wall;

using the second strain sensor for registering a strain of said second wall segment;

using said at least one oscillatory signal for ascertaining measured values representing said at least one physical measured variable of the fluid;

using the first strain signal as well as also the second strain signal for ascertaining a strain deviation value representing a difference between the strain of the first wall segment and the strain of the second wall segment;

and using said at least one oscillatory signal for ascertaining measured values, which represent the physical measured variable, as well as using, for ascertaining damage to the wall, the strain deviation value for ascertaining a deviation of the strain difference from an earlier ascertained, initial strain difference.

2. The method as claimed in claim 1, wherein:
the pressure device comprises a measuring transducer which measuring transducer is adapted to register at least one measured variable of the fluid and to transduce said at least one measured variable into at least one measurement signal corresponding to the measured variable.

3. The method as claimed in claim 2, wherein:
the pressure device comprises a transmitter electronics electrically coupled with the measuring transducer;
said transmitter electronics being adapted to receive the at least one measurement signal and said transmitter electronics being adapted to ascertain, with application of the measurement signal, at least one measured value, which represents the at least one measured variable.

4. The method as claimed in claim 3, wherein:
said ascertaining damage to the wall is executed with application of the transmitter electronics.

5. The method as claimed in claim 2, wherein:
the measuring transducer includes a tube arrangement for conveying flowable medium; and
the lumen of the pressure device is formed by means of the tube arrangement.

6. The method as claimed in claim 5, wherein:
the tube arrangement of the measuring transducer is formed by means of at least two tubes; and/or
the tube arrangement includes at least one of the wall segments.

7. The method as claimed in claim 5, wherein the tube arrangement of the measuring transducer is formed by means of at least one tube.

8. The method as claimed in claim 5, wherein the tube arrangement of the measuring transducer is formed by means of at least two tubes connected for parallel flow.

9. The method as claimed in claim 5, wherein the tube arrangement of the measuring transducer is formed by means of at least two curved tubes.

10. The method as claimed in claim 5, wherein the tube arrangement includes both, the first wall segment as well as also the second wall segment.

11. The method as claimed in claim 2, wherein the at least one measured variable is one of: a volume flow rate, a mass flow rate, a density, a viscosity, a pressure or a temperature.

12. The method as claimed in claim 1, wherein:
said ascertaining damage to the wall comprises using the strain deviation value for ascertaining a damage value $Err_{\Delta\varepsilon}$, namely a characterizing value for a damage characterizing number quantifying damage to the wall.

13. The method as claimed in claim 12, wherein:
said ascertaining damage to the wall comprises using the damage value.

14. The method as claimed in claim 13, wherein said ascertaining damage to the wall comprises a step of using the damage value in such a manner that the damage value is compared with a predetermined threshold value.

15. The method as claimed in claim 13, wherein the damage value represents a deviation of the strain difference from a reference value therefor, wherein the reference value is earlier ascertained on the pressure device with undamaged wall or earlier ascertained on an equally-constructed, other pressure device.

16. The method as claimed in claim 13, wherein the damage value $Err_{\Delta\varepsilon}$ fulfills a condition:

$$Err_{\Delta\varepsilon} = 1 - \frac{X_{\Delta\varepsilon}}{Ref_{\Delta\varepsilon}}.$$

17. The method as claimed in claim 13, wherein the damage value $\text{Err}_{\Delta\epsilon}$ fulfills a condition:

$$\text{Err}_{\Delta\epsilon} = \text{Ref}_{\Delta\epsilon} - X_{\Delta\epsilon}.$$

18. The method as claimed in claim 12, wherein: the damage value represents a deviation of the strain difference from a reference value therefor.

19. The method as claimed in claim 18, further comprising: ascertaining the reference value.

20. The method as claimed in claim 19, wherein: said ascertaining the reference value comprises using the strain value.

21. The method as claimed in claim 12, wherein said ascertaining damage to the wall comprises: using the strain deviation value for ascertaining a damage value, namely a characterizing value for a damage characterizing number quantifying damage to the wall; and wherein said generating the warning report comprises: comparing the damage value with a predetermined threshold value representing critical damage to the wall earlier established for the pressure device.

22. The method as claimed in claim 1, further comprising: modifying a pressure difference existing between a static internal pressure reigning within the lumen and an ambient pressure acting externally on the wall for elastically deforming at least portions of the wall, namely at least the first wall segment of the wall and at least the second wall segment of the wall.

23. The method as claimed in claim 22, wherein: said modifying the pressure difference comprises increasing the static internal pressure to a pressure value, which is greater than ambient pressure; and/or said modifying the pressure difference comprises allowing fluid to flow into the lumen of the pressure device; and/or said modifying the pressure difference comprises allowing fluid to flow through the lumen of the pressure device.

24. The method as claimed in claim 23, wherein: said modifying the pressure difference comprises allowing fluid to flow out of the lumen of the pressure device; and/or said modifying the pressure difference comprises increasing the static internal pressure to a pressure value, which is greater than ambient pressure by more than 10 bar.

25. The method as claimed in claim 24, wherein said modifying the pressure difference comprises: increasing the static internal pressure to a pressure value, which is greater than ambient pressure by more than 50 bar.

26. The method as claimed in claim 23, wherein said modifying the pressure difference comprises: increasing the static internal pressure to a pressure value, which is greater than ambient pressure by more than 0.5 bar.

27. The method as claimed in claim 1, further comprising: generating a warning report, which signals critical damage to the wall.

28. The method as claimed in claim 27, wherein: said generating the warning report comprises comparing the damage value with a predetermined threshold value.

29. The method as claimed in claim 27, wherein said ascertaining the reference value comprises: using the strain value in such a manner that the strain value is used as reference value.

30. The method as claimed in claim 27, wherein: said generating the warning report comprises using the strain value.

31. The method as claimed in claim 1, further comprising: ascertaining a strain value representing a strain of the wall.

32. The method as claimed in claim 31, wherein: said ascertaining damage to the wall comprises using the strain value.

33. The method as claimed in claim 31, wherein: said ascertaining the strain value comprises registering strain of at least one of the wall segments.

34. The method as claimed in claim 1, wherein: for ascertaining the strain deviation value at least one parameter measured value for a signal parameter characterizing a given strain signal is ascertained both from the first strain signal as well as also from the second strain signal.

35. The method as claimed in claim 34, wherein: for ascertaining the strain deviation value a difference is ascertained between the signal parameter derived from the first strain signal and the signal parameter derived from the second strain signal; and/or for ascertaining the strain deviation value a quotient is ascertained between the signal parameter derived from the first strain signal and the signal parameter derived from the second strain signal.

36. The method as claimed in claim 1, further comprising generating a warning report, which signals a damage corresponding to maximum allowable damage to the wall earlier established for the pressure device.

37. The method as claimed in claim 36, wherein: the first wall segment is a metal wall segment.

38. The method as claimed in claim 1, wherein: said ascertaining damage to the wall comprises registering a static internal pressure reigning within the lumen and/or registering a temperature of the wall.

39. The method as claimed in claim 1, further comprising: allowing fluid to flow into the lumen of the pressure device.

40. The method as claimed in claim 1, further comprising: allowing flow of fluid from the lumen of the pressure device.

41. The method as claimed in claim 1, wherein: the pressure device comprises a pipeline; and/or the pressure device comprises a tank; and/or the pressure device comprises a boiler.

42. The method as claimed in claim 1, wherein the fluid within the lumen of pressure device is one of: a gas, a liquid or a flowable dispersion.

43. The method as claimed in claim 1, wherein the fluid within the lumen of pressure device nominally acts with a static pressure of greater than 1 bar on the wall.

44. The method as claimed in claim 1, wherein the wall is a metal wall.

45. The method as claimed in claim 1, wherein the second wall segment is metal wall segment.

46. The method as claimed in claim 1, wherein the second wall segment wearing faster in comparison with the first wall segment.

47. The method as claimed in claim 1, wherein the second wall segment wearing more strongly in comparison with the first wall segment.

48. The method as claimed in claim 1, wherein the damage to be ascertained using the strain deviation value is a damage influencing a pressure resistance of the pressure device.

49. The method as claimed in claim 1, wherein the damage to be ascertained using the strain deviation value is a damage co-determining remaining life of the pressure device.

50. The method as claimed in claim 1, wherein the damage to be ascertained using the strain deviation value is a damage exceeding critical damage to the wall earlier established for the pressure device.

51. The method as claimed in claim 1, wherein the damage to be ascertained using the strain deviation value is a damage resulting from plastic deformation of the wall.

52. The method as claimed in claim 1, wherein the damage to be ascertained using the strain deviation value is a result of wear of the wall.

53. The method as claimed in claim 1, wherein the initial strain difference is ascertained for the pressure device with undamaged wall.

54. The method as claimed in claim 1, wherein the initial strain difference is ascertained for an equally constructed, other pressure device.

55. The method as claimed in claim 1, wherein the first strain signal shows an electrical voltage dependent on said strain and/or an electrical current dependent on said strain; and/or
wherein the second strain signal shows an electrical voltage dependent on said strain and/or an electrical current dependent on said strain.

56. The method as claimed in claim 1, wherein said ascertaining the strain deviation value comprises a step of using the first strain signal as well as also the second strain signal in such a manner that at least one signal parameter is derived both from the first strain signal as well as also from the second strain signal.

57. The method as claimed in claim 1, comprising: generating a warning report, which signals a damage requiring an inspection of the pressure device.

58. The method as claimed in claim 1, wherein said ascertaining damage to the wall comprises a step of using the strain deviation value for ascertaining a damage value, namely a characterizing value for a damage characterizing number quantifying damage to the wall, wherein the damage value represents a deviation of the strain difference from an earlier ascertained reference value.

59. The method as claimed in claim 1, wherein the strain value represents a local strain of the wall.

60. The method as claimed in claim 1, wherein the strain value represents an average strain of the wall.

61. The method as claimed in claim 1, wherein the strain value represents a strain of exactly one of the wall segments.

62. The method as claimed in claim 1, wherein said ascertaining the strain value comprises: registering strain of at least one of at least the first wall segment.

63. The method as claimed in claim 1, wherein said ascertaining damage to the wall comprises: registering a static internal pressure reigning within the lumen, relative to an ambient pressure acting externally on the wall.

64. The method as claimed in claim 1, wherein said ascertaining damage to the wall comprises: registering a temperature of the wall on a side of the wall facing away from the lumen.

65. The method as claimed in claim 1, wherein the pressure device comprises a measuring transducer, which measuring transducer is adapted to register at least one fluid dynamic measured variable.

66. The method as claimed in claim 1, wherein the pressure device comprises a measuring transducer, which measuring transducer is adapted to register at least one thermodynamic measured variable.

67. A measuring system for ascertaining measured values representing at least one measured variable of a fluid, said measuring system comprising:
a pressure device for conveying and/or storing the fluid in a lumen surrounded by a wall, said pressure device including a measuring transducer for delivering at least one measurement signal corresponding to the measured variable, said measuring transducer including an oscillation exciter, at least one oscillation sensor, a tube arrangement forming said lumen, and a measuring transducer housing forming a cavity accommodating said tube arrangement, said oscillation exciter and said at least one oscillation sensor;
a first strain sensor affixed on a first wall segment of said wall for producing a first strain signal dependent on a time variable strain of said first wall segment;
at least a second strain sensor affixed on a second wall segment of said wall spaced from said first wall segment for producing a second strain signal dependent on a time variable strain of said second wall segment; and
a transmitter electronics, said transmitter electronics is adapted to deliver at least one electrical driver signal for driving said measuring transducer and said transmitter electronics being adapted to receive said at least one measurement signal, as well as, with application of the measurement signal, to ascertain a measured value, which represents said physical measured variable of the fluid; wherein:
the tube arrangement includes at least one tube for conveying the fluid and the tube arrangement is adapted to be flowed through by fluid such that the first wall segment is spaced from the second wall segment relative to a flow direction of the fluid;
the oscillation exciter is adapted to act on said at least one tube;
the at least one tube is adapted to execute mechanical oscillations caused by the oscillation exciter;
the at least one oscillation sensor is adapted to convert movements of the at least one tube into at least one oscillatory signal showing at least one signal parameter dependent on the measured variable; and wherein:
the transmitter electronics is electrically coupled with said at least one oscillation and said first strain and second strain sensors, and adapted to receive the at least one measurement signal as well as said first and second strain signals;
the transmitter electronics is adapted to ascertain, with application of said at least one measurement signal, a measured value, which represents the physical measured variable, and
the transmitter electronics is adapted, for ascertaining damage to the wall, to generate a strain deviation value representing a difference between the strain of the first wall segment and the strain of the second wall segment and to use said strain deviation value for ascertaining a deviation of the strain difference from an earlier ascertained, initial strain difference.

68. The measuring system as claimed in claim 67, wherein:
said transmitter electronics is adapted to deliver at least one electrical driver signal driving said measuring transducer.

69. The measuring system as claimed in claim 68, wherein:

said transmitter electronics is adapted, for generating the strain deviation value, to ascertain for signal parameters characterizing said first strain signal as well as said second strain signal.

70. The measuring system as claimed in claim 69, wherein:
said transmitter electronics is adapted to ascertain, for each of the two strain signals, in each case, at least one location parameter thereof, and/or, in each case, at least one scatter parameter and to use the results of the ascertaining for generating the strain deviation value.

71. The measuring system as claimed in claim 67, wherein:
said transmitter electronics is adapted, based on said first and said second strain signals, to ascertain a damage value, namely a characterizing number value for a damage characterizing number instantaneously quantifying damage to said wall.

72. The measuring system as claimed in claim 71, wherein:
said damage value represents a deviation of the strain deviation value from a reference value therefor.

73. The measuring system as claimed in claim 71, wherein:
said transmitter electronics is adapted, for ascertaining damage to said wall, to compare the damage value with a predetermined threshold value.

74. The measuring system as claimed in claim 67, wherein:
said tube arrangement of said measuring transducer includes at least two tubes.

75. The measuring system as claimed in claim 74, wherein:
said first strain sensor is affixed on one of said tubes; and/or
said second strain sensor is affixed on one of said tubes.

76. The measuring system as claimed in claim 75, wherein:
both said first strain sensor as well as also said second strain sensor are affixed on one of said tubes, in such a manner that said second strain sensor is not affixed on the same tube as said first strain sensor.

77. The measuring system as claimed in claim 67, wherein:
said transmitter electronics is adapted, based on said first as well as also said second strain signals especially with application of a strain deviation value ascertained based on said first strain signal and said second strain signal, and representing a deviation between the strain of said first wall segment and the strain of said second wall segment—to generate a warning report signaling the damage.

78. The measuring system as claimed in claim 77, wherein:
said transmitter electronics is adapted to generate said warning report, in case a damage value ascertained based on said first and said second strain signals exceeds a predetermined threshold value.

79. The measuring system as claimed in claim 67, wherein:
said transmitter electronics is coupled with said measuring transducer.

80. The measuring system as claimed in claim 79, wherein:
said transmitter electronics is adapted to receive the at least one measurement signal, as well as, with application of the measurement signal, to ascertain a measured value, which represents a physical measured variable of the fluid; and/or
said transmitter electronics is adapted to deliver at least one electrical driver signal driving said measuring transducer and inducing in said measuring transducer a measurable effect corresponding to the at least one measured variable.

81. The measuring system as claimed in claim 67, wherein:
said first wall segment is arranged upstream of said second wall segment relative to the flow direction of the fluid.

\* \* \* \* \*